(12) United States Patent
Higashide et al.

(10) Patent No.: US 11,461,719 B2
(45) Date of Patent: Oct. 4, 2022

(54) OPERATION MANAGEMENT APPARATUS AND OPERATION MANAGEMENT METHOD OF AUTONOMOUS TRAVEL VEHICLE

(71) Applicants: TOYOTA JIDOSHA KABUSHIKI KAISHA, Toyota (JP); DENSO CORPORATION, Kariya (JP)

(72) Inventors: Hiroshi Higashide, Toyota (JP); Kenji Okazaki, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 17/193,132

(22) Filed: Mar. 5, 2021

(65) Prior Publication Data

US 2021/0312367 A1 Oct. 7, 2021

(30) Foreign Application Priority Data

Apr. 2, 2020 (JP) .............................. JP2020-066653

(51) Int. Cl.
*G06Q 10/06* (2012.01)
(52) U.S. Cl.
CPC . *G06Q 10/06315* (2013.01); *G06Q 10/06312* (2013.01)
(58) Field of Classification Search
None
See application file for complete search history.

(56) References Cited

U.S. PATENT DOCUMENTS

| | | | |
|---|---|---|---|
| 2016/0117610 A1* | 4/2016 | Ikeda | G06Q 10/02 705/5 |
| 2018/0109399 A1* | 4/2018 | Cardoso de Moura | H04W 88/06 |
| 2019/0197798 A1* | 6/2019 | Abari | G06N 20/00 |
| 2019/0265703 A1* | 8/2019 | Hicok | G05D 1/0242 |
| 2021/0264784 A1* | 8/2021 | Tatsumoto | G06Q 10/06315 |
| 2021/0311495 A1* | 10/2021 | Higashide | G05D 1/0297 |
| 2021/0312812 A1* | 10/2021 | Higashide | G08G 1/127 |
| 2021/0312813 A1* | 10/2021 | Higashide | G06Q 10/06315 |

FOREIGN PATENT DOCUMENTS

JP 2000-264210 A 9/2000

* cited by examiner

*Primary Examiner* — Folashade Anderson
(74) *Attorney, Agent, or Firm* — Oliff PLC

(57) ABSTRACT

A schedule changer executes, as a schedule change process for changing a normal operation schedule, a cut-in change process in which a plurality of operating vehicles are divided into a sequence of an advanced vehicle line group for which a departure target time is advanced from a departure target time determined based on the normal operation schedule, and a sequence of a delayed vehicle line group for which the departure target time is delayed from the departure target time determined based on the normal operation schedule, and an inter-vehicle space between the advanced vehicle line group and the delayed vehicle line group is enlarged for an additional vehicle.

10 Claims, 16 Drawing Sheets

OPERATION MANAGEMENT APPARATUS AND OPERATION MANAGEMENT METHOD OF AUTONOMOUS TRAVEL VEHICLE

CROSS REFERENCE TO RELATED APPLICATION

This application claims priority to Japanese Patent Application No. 2020-066653 filed on Apr. 2, 2020, which is incorporated herein by reference in its entirety including the specification, claims, drawings, and abstract.

TECHNICAL FIELD

The present disclosure relates to an operation management apparatus and an operation management method for a vehicle, for managing operations of a plurality of vehicles which travel autonomously on a circuit on which a plurality of stops are provided.

BACKGROUND

In recent years, a transportation system has been proposed which uses a vehicle which can travel autonomously. For example, JP 2000-264210 A discloses a vehicle transportation system which uses a vehicle which can travel autonomously along a dedicated path. This vehicle transportation system comprises a plurality of vehicles which travel along the dedicated path, and a supervision and control system which enables operations of the plurality of vehicles. The supervision and control system transmits a departure command and a course command to the vehicle according to an operation plan. The supervision and control system also increases or decreases a number of the vehicles according to a boarding demand.

When a vehicle is to be additionally introduced to a circuit, the operation schedules of operating vehicles which are already traveling on the circuit are changed. FIG. 16 shows an example configuration in which an additional vehicle C5 is added to operating vehicles C1~C4. In this example configuration, the operation schedule is changed from a schedule in which 4 vehicles operate with an interval of 15 minutes to a schedule in which 5 vehicles operate with an interval of 12 minutes. As shown in this example configuration, because the additional vehicle C5 is introduced between the operating vehicle C1 and the operating vehicle C2, the operation schedules of the operating vehicles C2~C4 are delayed.

However, delays in the operating vehicles may lead to reduction in user satisfaction. The present disclosure provides an operation management apparatus and an operation management method of vehicles which can reduce, in comparison to the related art, a number of operating vehicles which are delayed when an additional vehicle is introduced.

SUMMARY

According to one aspect of the present disclosure, there is provided an operation management apparatus of a plurality of autonomous travel vehicles which travel autonomously on a circuit. The operation management apparatus comprises an operation schedule provider, an introduction judgment unit, and a schedule changer. The operation schedule provider provides, to each of a plurality of operating vehicles which are traveling autonomously on the circuit, a normal operation schedule in which an arrival target time and a departure target time to and from each of a plurality of stops provided on the circuit are determined. The introduction judgment unit judges whether or not an additional vehicle is to be introduced to the circuit based on a boarding demand on the circuit. When the introduction judgment unit decides on the introduction of the additional vehicle, the schedule changer changes the operation schedule to be provided to each of the plurality of operating vehicles from the normal operation schedule. The schedule changer executes, as a schedule change process for changing the normal operation schedule, a cut-in change process in which the plurality of operating vehicles are divided into a sequence of an advanced vehicle line group for which the departure target time is advanced from the departure target time determined based on the normal operation schedule, and a sequence of a delayed vehicle line group for which the departure target time is delayed from the departure target time determined based on the normal operation schedule, and an inter-vehicle space between the advanced vehicle line group and the delayed vehicle line group is enlarged for the additional vehicle.

According to the above-described structure, when the additional vehicle is to be introduced, the plurality of operating vehicles are divided into an advanced vehicle line group and a delayed vehicle line group. Therefore, a number of operating vehicles which are delayed can be reduced in comparison to a configuration in which all operating vehicles are delayed.

According to another aspect of the present disclosure, in the above-described configuration, the schedule changer may set, as a leading vehicle of the delayed vehicle line group, an operating vehicle, among all of the operating vehicles, having the shortest one-lap wait time, which is a total sum, for one lap of the circuit, of wait times which are times from loading/unloading completion times to the departure target times at the stops.

As will be described below, a push-back magnitude of the departure target time of the leading vehicle of the delayed vehicle line group is the longest within this group. With the push back of the departure target time, the wait time is correspondingly elongated. By setting the operating vehicle having the shortest one-lap wait time as the leading vehicle of the delayed vehicle line group, excessive elongation of the wait time of this vehicle can be suppressed.

According to another aspect of the present disclosure, in the above-described configuration, the schedule changer may determine a number of the operating vehicles included in the advanced vehicle line group based on the one-lap wait time determined for each of the operating vehicles, and may determine a remaining number of the operating vehicles as a number of vehicles of the delayed vehicle line group.

Because the wait time is a time from the loading/unloading completion time to the departure target time, the wait time may be considered as a time in which advancement of the departure target time is possible. In addition, as will be described below, in a front-load change process, an advancement magnitude of the departure target time becomes larger for a later following operating vehicle. By determining the number of the operating vehicles in the advanced vehicle line group according to the length of the wait time, a schedule change with a high realization possibility can be enabled.

According to another aspect of the present disclosure, in the above-described configuration, the schedule changer may determine an advancement magnitude of the departure target time at each of the stops according to a track record value of the wait time, at each of the stops, of each of the operating vehicles included in the advanced vehicle line group.

By determining the advancement magnitude according to the track record value of the wait time at each of the stops, a schedule change with a high realization possibility can be enabled.

According to another aspect of the present disclosure, there is provided an operation management method of a plurality of autonomous travel vehicles which travel autonomously on a circuit. In the operation management method, a normal operation schedule in which an arrival target time and a departure target time to and from each of a plurality of stops provided on the circuit are determined is provided to each of a plurality of operating vehicles which are traveling autonomously on the circuit. It is judged whether or not an additional vehicle is to be introduced to the circuit based on a boarding demand on the circuit. When the introduction of the additional vehicle is decided, the operation schedule to be provided to each of the plurality of operating vehicles is changed from the normal operation schedule. As a schedule change process for changing the normal operation schedule, a cut-in change process is executed in which the plurality of operating vehicles are divided into a sequence of an advanced vehicle line group for which the departure target time is advanced from the departure target time determined based on the normal operation schedule, and a sequence of a delayed vehicle line group for which the departure target time is delayed from the departure target time determined based on the normal operation schedule, and an inter-vehicle space between the advanced vehicle line group and the delayed vehicle line group is enlarged for the additional vehicle.

According to another aspect of the present disclosure, in the above-described configuration, an operating vehicle, among all of the operating vehicles, having the shortest one-lap wait time, which is a total sum, for one lap of the circuit, of wait times which are times from loading/unloading completion times to the departure target times at the stops, may be set as a leading vehicle of the delayed vehicle line group.

According to another aspect of the present disclosure, in the above-described configuration, a number of the operating vehicles included in the advanced vehicle line group may be determined based on the one-lap wait time determined for each of the operating vehicles, and a remaining number of the operating vehicles may be determined as a number of vehicles of the delayed vehicle line group.

According to another aspect of the present disclosure, in the above-described configuration, an advancement magnitude of the departure target time at each of the stops may be determined according to a track record value of the wait time, at each of the stops, of each of the operating vehicles included in the advanced vehicle line group.

According to various aspects of the present disclosure, a number of operating vehicles which are delayed when an additional vehicle is introduced can be reduced compared to the related art.

BRIEF DESCRIPTION OF DRAWINGS

Embodiment(s) of the present disclosure will be described based on the following figures, wherein.

DESCRIPTION OF EMBODIMENTS

Figure 1:
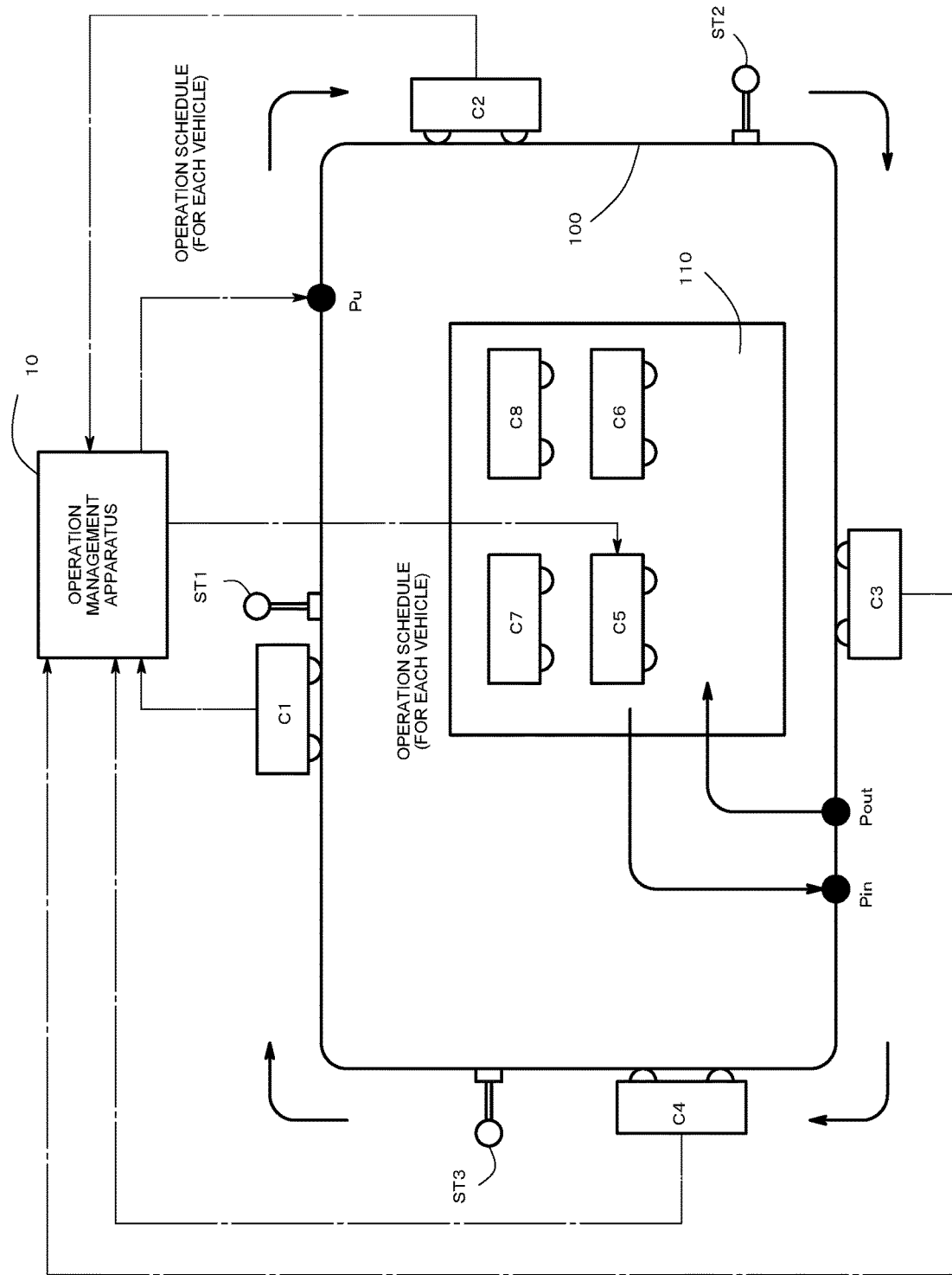
FIG. 1 is a schematic diagram of a transportation system in which an operation management apparatus according to an embodiment of the present disclosure is provided.

FIG. 1 is a schematic diagram which shows a transportation system including an operation management apparatus 10 according to an embodiment of the present disclosure. The transportation system includes, in addition to the operation management apparatus 10, operating vehicles C1~C4, waiting vehicles C5~C8, and stops ST1~ST3.

In the following description, when the plurality of vehicles C1~C8 are not to be distinguished, the index for distinguishing the vehicles may be omitted, and a vehicle may be simply described as "vehicle C". Similarly, when the plurality of stops ST1~ST3 do not need to be distinguished, a stop may be simply described as "stop ST".

In the transportation system exemplified in FIG. 1, the vehicle C travels along a circuit 100 which is predefined, and an unspecified large number of users are transported. The vehicle C operates in circulating manner in one-way travel on the circuit 100, as shown by an arrow in the figure.

The circuit 100 may be a dedicated road, for example, on which only the vehicles C are allowed to travel. When the vehicle C is a railroad vehicle, the circuit 100 may be a circulating line. Alternatively, the circuit 100 may be a road segment which is set on a normal road on which vehicles other than the vehicles C can travel.

In addition, a shed 110 is provided on the transportation system, connected to the circuit 100. In FIG. 1, waiting vehicles C5~C8 waiting in the shed 110 are shown. Among the waiting vehicles, an additional vehicle to be additionally introduced to the circuit 100 (for example, the waiting vehicle C5) is selected.

As connection points with the shed 110, a retrieval point Pout and an introduction point Pin are provided on the circuit 100. In the example configuration of FIG. 1, the retrieval point Pout and the introduction point Pin are provided between the stops ST2 and ST3.

The operating vehicles C1~C4 traveling on the circuit 100 enter the shed 110 at the retrieval point Pout. The waiting vehicles C5~C8 waiting in the shed 110 are introduced into the circuit 100 from the introduction point Pin. In order to avoid crossover between a vehicle C to be retrieved and a vehicle C to be introduced, the retrieval point Pout is provided upstream of the introduction point Pin.

Further, an operation schedule updating point Pu is provided on the circuit 100, for sending an operation schedule of each vehicle to each of the operating vehicles C1~C4. At the schedule updating point Pu, an operation schedule for one lap starting from the operation schedule updating point Pu, for the vehicle C passing the point, is provided from the operation management apparatus 10 to the vehicle C. In this manner, in the vehicle C, the operation schedule is changed every time the vehicle C passes the schedule updating point Pu (that is, for each lap). Details of a method of providing the operation schedule will be described later.

<Structure of Stop>

A plurality of stops ST are provided on the circuit 100. FIG. 1 shows three stops ST1~ST3, but the number is not limited to three, and an arbitrary number of stops are provided on the circuit 100 according to an overall length of the circuit 100, buildings along the circuit 100, or the like. For example, the stop ST is provided erected on a walkway at a side of a roadway on which the operating vehicles C1~C4 travel. The stop ST can communicate with the operation management apparatus 10, for example, via a dedicated communication line or the like. Further, the stop ST can wirelessly communicate with the vehicles C.

Figure 2:
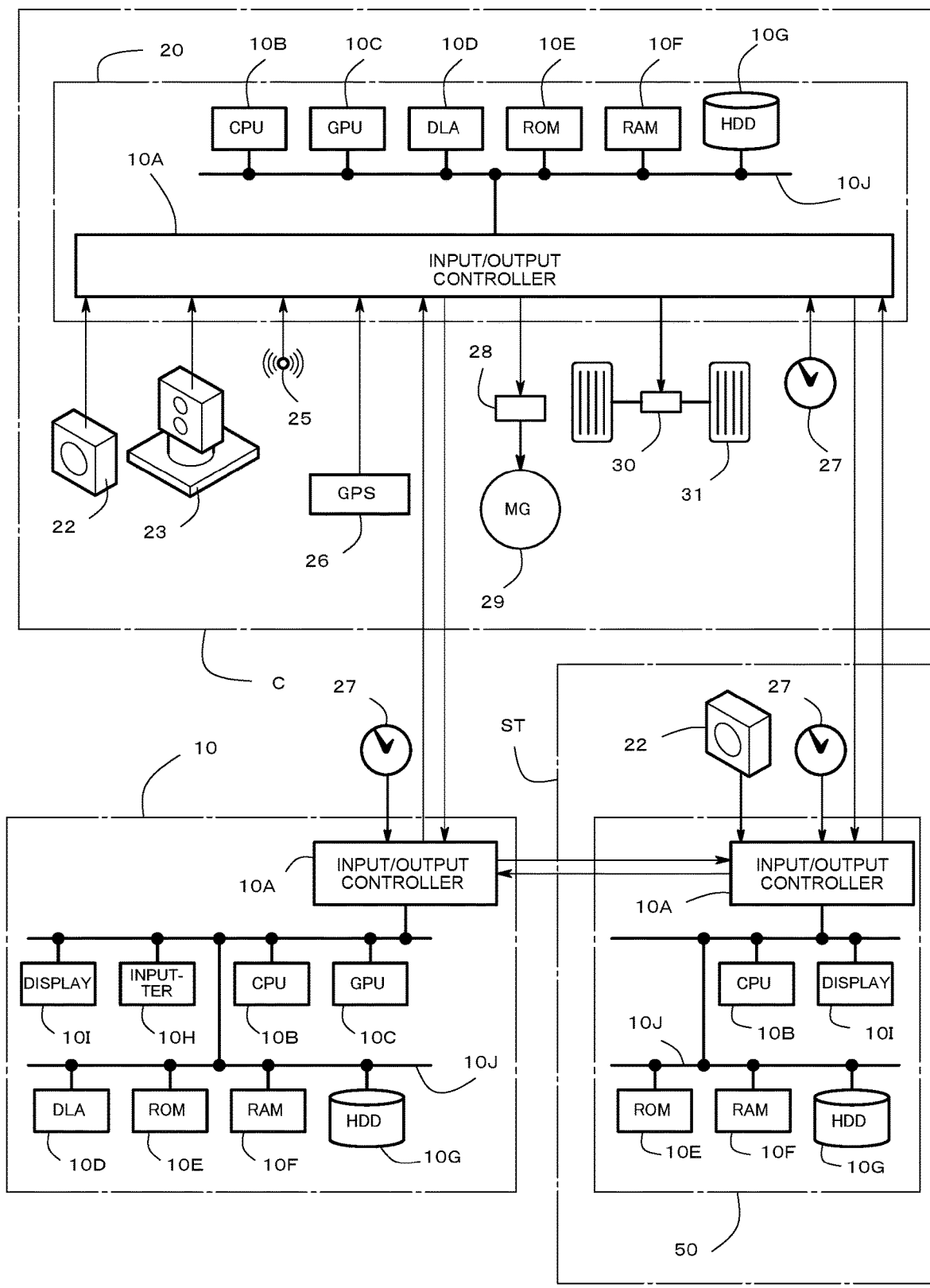
FIG. 2 is a hardware structure diagram of an operation management apparatus, an autonomous travel vehicle, and a stop.

FIG. 2 shows hardware structures of the stop ST, the vehicle C, and the operation management apparatus 10. The stop ST includes a camera 22, a clock 27, and a controller 50. The camera 22 is for imaging passengers waiting the vehicle C at the stop ST, and can image, for example, at least one of a still image or a video image of a periphery of the stop ST.

The controller 50 has, as a hardware structure, an input/output controller 10A, a CPU 10B, a ROM 10E, a RAM 10F, a hard disk drive 10G (HDD), and a display 10I, and these constituent components are connected to an internal bus 10J.

Figure 3:
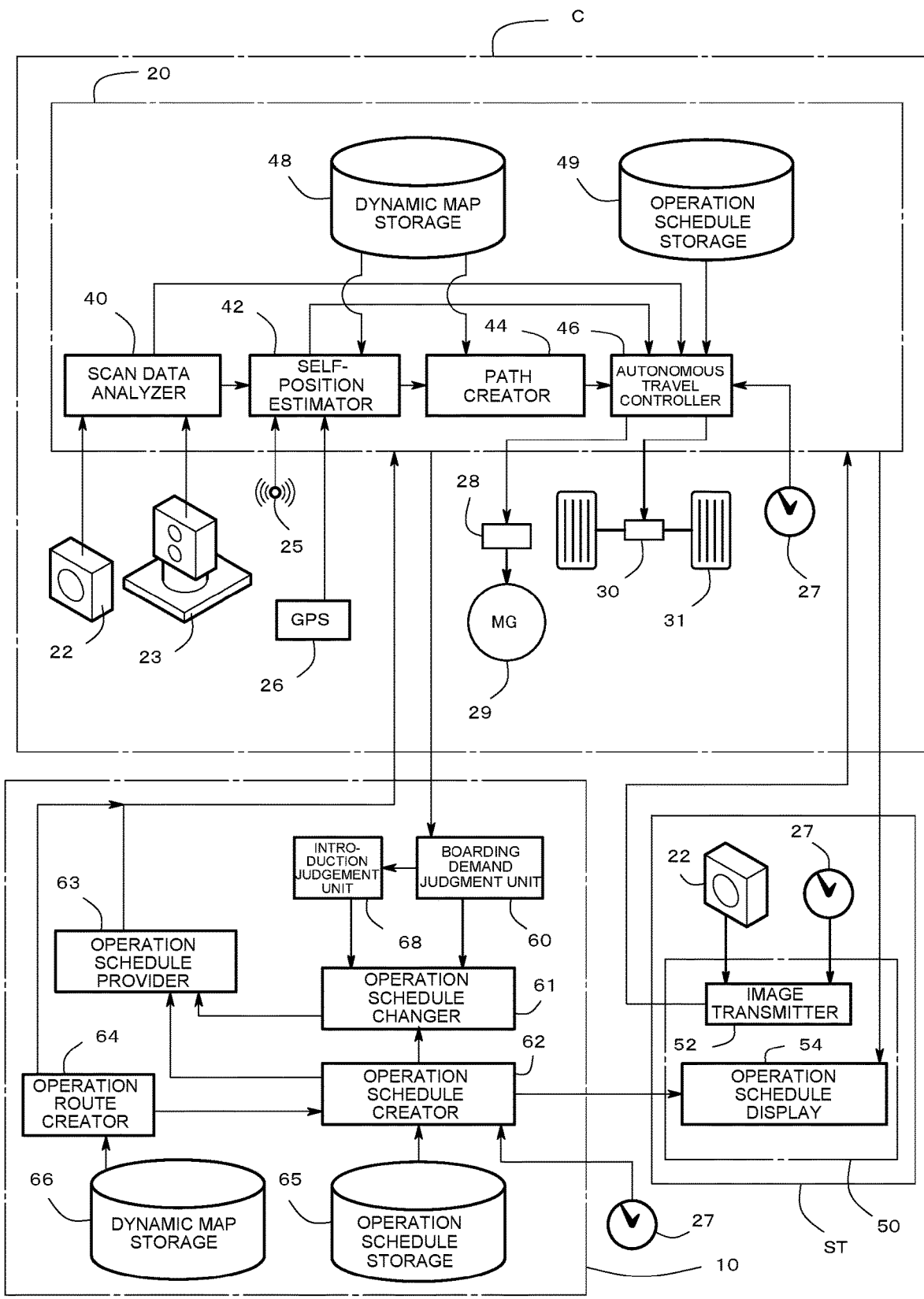
FIG. 3 is a functional block diagram of an operation management apparatus, an autonomous travel vehicle, and a stop.

FIG. 3 shows functional blocks of the stop ST, the vehicle C, and the operation management apparatus 10 in a state of being mixed with the hardware. The controller 50 of the stop ST has, as functional blocks, an image transmitter 52, and an operation schedule display 54.

The image transmitter 52 transmits image data of the periphery of the stop ST captured by the camera 22 to the vehicle C along with time data obtained from the clock 27. The transmitted image data and time data are used for calculating a loading/unloading completion time Tp, to be described later. The operation schedule of the vehicle C is sent from the operation management apparatus 10 to the operation schedule display 54. For example, the operation schedule which is updated every predetermined time period is transmitted from the operation management apparatus 10 to the controller 50. Upon reception of the schedule, the operation schedule display 54 displays a planned arrival time (arrival target time Ta* to be described later) of the vehicle C which will arrive at the stop ST.

<Structure of Vehicle>

The vehicle C is a vehicle which can travel autonomously on the circuit 100, and functions as, for example, a shared vehicle which transports an unspecified large number of users from a predetermined stop ST to another stop ST. The vehicle C may be, for example, an autobus. As exemplified in FIGS. 2 and 3, the vehicle C is an electricity-driven vehicle which has a rotary electric machine 29 (motor) as a drive source, and a battery (not shown) as a power supply. The vehicle C can communicate with, that is, exchange data with, the operation management apparatus 10 and the stop ST via a wireless communication.

The vehicle C is equipped with various mechanisms for enabling the autonomous travel. Specifically, the vehicle C includes a controller 20, a camera 22, a lidar unit 23, a proximity sensor 25, a GPS receiver 26, a clock 27, a drive mechanism 28, and a steering mechanism 30.

The camera 22 images a field of view which is approximately identical to that of the lidar unit 23. The camera 22 has an image sensor such as, for example, a CMOS sensor, a CCD sensor, or the like. An image captured by the camera 22 (captured image) is used for the autonomous travel control, as will be described below.

The lidar unit 23 (LIDAR Unit) is a sensor for autonomous travel, and is, for example, a distance measurement sensor which uses infrared. For example, an infrared laser light ray is scanned from the lidar unit 23 in a horizontal direction and in a vertical direction, so that three-dimensional point group data can be obtained in which distance measurement data for a peripheral environment of the vehicle C are three-dimensionally arranged. The camera 22 and the lidar unit 23 are provided as a collective sensor unit, for example, on four surfaces including a front surface of the vehicle C, a rear surface, and respective side surfaces connecting the front surface and the rear surface.

The proximity sensor 25 is, for example, a sonar sensor, and detects, for example, a distance between a curb, which is a boundary between the roadway and the walkway, and the vehicle C, when the vehicle C stops at the stop ST. This detection enables stopping with the vehicle C pulled over near the curb, a process commonly known as precise docking. The proximity sensor 25 is provided, for example, on respective side surfaces and on corners of the front surface and the side surfaces of the vehicle C.

The GPS receiver 26 receives a position measurement signal from a GPS satellite. For example, with the reception of the position measurement signal, a current position (latitude and longitude) of the vehicle C is determined.

The controller 20 may be, for example, an electrical control unit (ECU) of the vehicle C, and is formed from a computer. The controller 20 exemplified in FIG. 2 includes an input/output controller 10A which controls input and output of data. In addition, the controller 20 includes, as computing elements, a CPU 10B, a GPU 10C (Graphics Processing Unit), and a DLA 10D (Deep Learning Accelerators). Further, the controller 20 includes, as storage units, a ROM 10E, a RAM 10F, and a hard disk drive 10G (HDD). These constituent components are connected to an internal bus 10J.

FIG. 3 shows functional blocks of the controller 20. The functional blocks include a scan data analyzer 40, a self-position estimator 42, a path creator 44, and an autonomous travel controller 46. Moreover, the controller 20 includes, as storage units, a dynamic map storage 48, and an operation schedule storage 49.

The dynamic map storage 48 stores dynamic map data of the circuit 100 and a periphery thereof. The dynamic map is a three-dimensional map, and stores, for example, a position and a shape (three-dimensional shape) of the road (roadway and walkway). In addition, positions of a traffic lane, a crosswalk, a stop line, or the like drawn on the road are also stored in the dynamic map. In addition, a position and a shape (three-dimensional shape) of a building, and constructions such as a signal light for vehicle, are also stored in the dynamic map. The dynamic map data is provided from the operation management apparatus 10.

The operation schedule storage 49 stores an operation schedule of the vehicle C equipped with the storage. As described above, the operation schedule is updated once per lap at the operation schedule updating point Pu (refer to FIG. 1).

The vehicle C travels autonomously along the data of the circuit 100 stored in the dynamic map storage 48. In the autonomous travel, the three-dimensional point group data of the peripheral environment of the vehicle C is acquired by the lidar unit 23. In addition, the image of the peripheral environment of the vehicle C is captured by the camera 22.

An object in the captured image captured by the camera 22 is analyzed by the scan data analyzer 40. For example, an object in the captured image is detected by known deep learning methods such as SSD (Single Shot Multibox Detector) and YOLO (You Only Look Once) using supervised learning, and attributes of the detected object (such as a stop ST, a passerby, a construction, or the like) are recognized.

In addition, the scan data analyzer 40 acquires the three-dimensional point group data (lidar data) from the lidar unit 23. By overlapping the captured image of the camera 22 and the lidar data, it becomes possible to determine what object of what attribute (a stop ST, a passerby, a construction, or the like) is positioned at what distance from the vehicle.

The self-position estimator 42 estimates a self position (own position) in the dynamic map based on a self position (latitude and longitude) received from the GPS receiver 26.

The path creator 44 creates a path from the estimated self position to an immediately near (the closest) target point. For example, a path from the self position to the stop ST is created. When it becomes certain that an obstacle exists on a straight-line path from the self position to the stop ST based on the three-dimensional point group data by the lidar unit 23 and the captured image by the camera 22, a path is created to avoid the obstacle.

The autonomous travel controller 46 executes travel control of the vehicle C based on the overlap data of the captured image and the lidar data, the self position, the path which is already created, and the operation schedule, determined as described above. For example, a traveling velocity on the path which is already created is determined at a velocity V1 (to be described later) determined by the operation schedule. For example, the autonomous travel controller 46 controls the drive mechanism 28, such as an inverter, to maintain the velocity of the vehicle C at the velocity V1. In addition, the autonomous travel controller 46 operates a wheel 31 through control of the steering mechanism 30, such as an actuator, to control the vehicle C to proceed on the determined path.

At the stop ST, the autonomous travel controller 46 opens a loading/unloading door (not shown) after stopping the vehicle C. In this process, the autonomous travel controller 46 refers to the clock 27, and transmits an actual arrival time Ta, which is a time when the vehicle C has actually arrived at the stop ST, to the operation management apparatus 10. Moreover, the autonomous travel controller 46 refers to the clock 27, and maintains the vehicle C at a stopped state until a departure target time Td* (to be described later) determined by the operation schedule is reached.

Further, when a loading passenger still remains at the stop ST or when an unloading passenger from the vehicle C still remains even after the departure target time Td*, the stopped state of the vehicle C is maintained. When it is judged that there are no more loading/unloading passengers, the autonomous travel controller 46 closes the loading/unloading door (not shown), and applies travel control so that the vehicle C moves away from the stop ST. In this process, the autonomous travel controller 46 refers to the clock 27, and transmits an actual departure time Td, which is a time when the vehicle C has actually departed from the stop, to the operation management apparatus 10.

As a means of judging whether or not a loading passenger still remains at the stop ST (a line is still formed), for example, the camera 22 and the lidar unit 23 which are provided outside of the vehicle C are used. For example, with the overlap data of the captured image and the lidar data, judgment of presence or absence of the loading passenger at the stop ST may be enabled. Alternatively, a captured image by the camera 22 of the stop ST may be received and the image may be analyzed by the scan data analyzer 40, to thereby enable judgment of the presence or absence of the loading passengers at the stop ST.

The scan data analyzer 40 compares, for example, a loading completion time determined based on the overlap data of the captured image by the camera 22 of the vehicle C and the lidar data by the lidar unit 23, and a loading completion time determined based on the captured image by the camera 22 of the stop ST. For example, the scan data analyzer 40 sets a later time of these two times, that is, a time at which the loading has been reliably completed in consideration of these times, as a true loading completion time.

Further, as a method of judging whether or not an unloading passenger still remains in the vehicle C, for example, an image captured by a camera provided inside the vehicle C (not shown) is used. For example, a captured image of the inside of the vehicle cabin is analyzed by the scan data analyzer 40, and presence or absence of the unloading passenger is determined. The scan data analyzer 40 refers to the clock 27, and sets a time when the unloading is completed as an unloading completion time.

In addition, the scan data analyzer 40 transmits, to the operation management apparatus 10, a later one of the true loading completion time and the unloading completion time described above, for example, as a loading/unloading completion time Tp, which is the time when the loading and unloading are completed at the stop ST.

<Structure of Operation Management Apparatus>

The operation management apparatus 10 manages the operations of the vehicles C which travel autonomously on the circuit 100. The operation management apparatus 10 is placed, for example, in a management company which manages the operations of the vehicles C. The operation management apparatus 10 is formed from, for example, a computer. FIG. 2 shows a hardware structure of the operation management apparatus 10.

Similar to the hardware structure of the vehicle C, the operation management apparatus 10 comprises an input/output controller 10A, a CPU 10B, a GPU 10C, a DLA 10D, a ROM 10E, a RAM 10F, and a hard disk drive 10G (HDD). These constituting components are connected to an internal bus 10J.

The operation management apparatus 10 further comprises an inputter 10H such as a keyboard and a mouse, for inputting data as necessary. The operation management apparatus 10 further comprises a display 10I such as a display device for graphically displaying the operation schedule or the like. The inputter 10H and the display 10I are connected to the internal bus 10J.

FIG. 3 shows functional blocks of the operation management apparatus 10. The operation management apparatus 10 includes, as storage units, an operation schedule storage 65 and a dynamic map storage 66. In addition, the operation management apparatus 10 includes, as functional units, a boarding demand judgment unit 60, an operation schedule changer 61, an operation schedule creator 62, an operation schedule provider 63, an operation route creator 64, and an introduction judgment unit 68.

The operation route creator 64 creates a route on which the vehicle C is to travel, that is, the circuit 100. For example, a path is selected from a road which includes a branch, to create the circuit 100. Dynamic map data corresponding to the circuit 100 which is created is extracted from the dynamic map storage 66, and is transmitted to the vehicle C.

The operation schedule creator 62 creates a normal operation schedule to be described later. The boarding demand judgment unit 60 determines a boarding demand for each of the operating vehicles C1~C4 based on a wait time Dw to be described later. The introduction judgement unit 61 judges whether or not an additional vehicle is to be introduced to the circuit 100 based on the determined boarding demand.

When the introduction judgment unit 68 decides on introduction of the additional vehicle, the operation schedule changer 61 changes the operation schedule to be provided to each of the operating vehicles C1~C4 which are already traveling autonomously on the circuit 100, from the normal schedule.

The operation schedule provider 63 provides the normal operation schedule created by the operation schedule creator 62 to each of the operating vehicles C1~C4 at the operation schedule updating point Pu. In addition, when the operation schedule has been changed by the operation schedule changer 61 from the normal operation schedule, the operation schedule provider 63 temporarily stops provision of the normal operation schedule, and provides the changed operation schedule to each of the operating vehicles C1~C4 at the operation schedule updating point Pu.

<Normal Operation Schedule>

The normal operation schedule is an operation schedule which is applied when the operating vehicles (vehicles C1~C4 in FIG. 1) which travel autonomously on the circuit 100 travel in circle while the number of the operating vehicles is maintained. In other words, the normal operation schedule is applied when the vehicles C1~C4 travel one lap of the circuit 100 in a state without an increase or a decrease in the number of vehicles.

For example, in the normal operation schedule, an inter-vehicle space of vehicles C traveling in front and to the rear is uniformly determined. In addition, a stopping time (planned stopping time to be described later) at each of the stops ST1~ST3 is uniformly set for the vehicles C, and a setting velocity is also uniformly set for the vehicles C. The setting velocity V1 and the planned stopping time at each of the stops ST1~ST3 which are set in the normal operation schedule are also herein referred to as "normal value(s)". From this viewpoint, the normal operation schedule may also be considered as an operation schedule formed using the normal value(s). The normal operation schedule is determined by the operation schedule creator 62 of the operation management apparatus 10 in advance, for example, before the operation is actually executed with the operation schedule.

As will be described later, in introducing an additional vehicle, the velocity and the planned stopping time which are uniformly set for the vehicles in the normal operation schedule are changed for at least some of the operating vehicles. With such a schedule change, the inter-vehicle space is enlarged for the additional vehicle.

Figure 4:
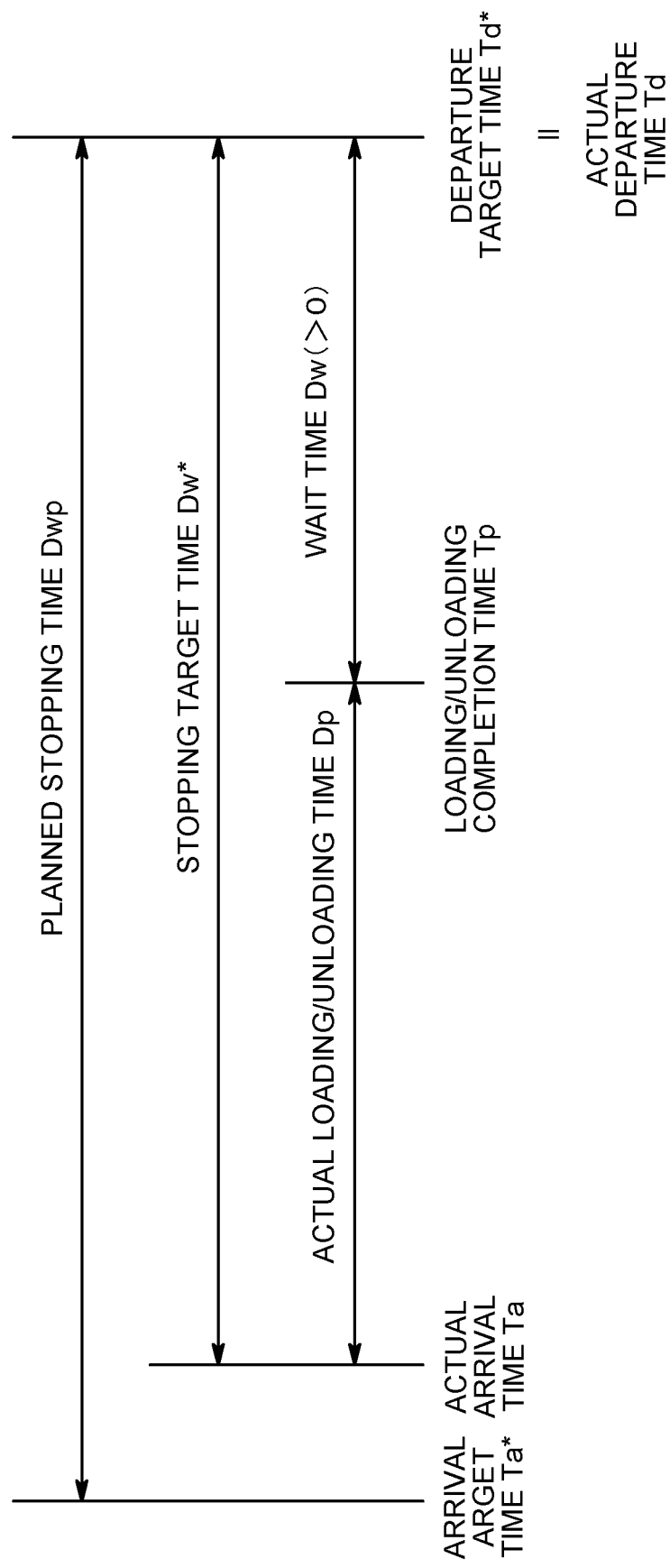
FIG. 4 is an explanatory diagram (1/2) of terms used in an operation schedule creation.
Figure 5:
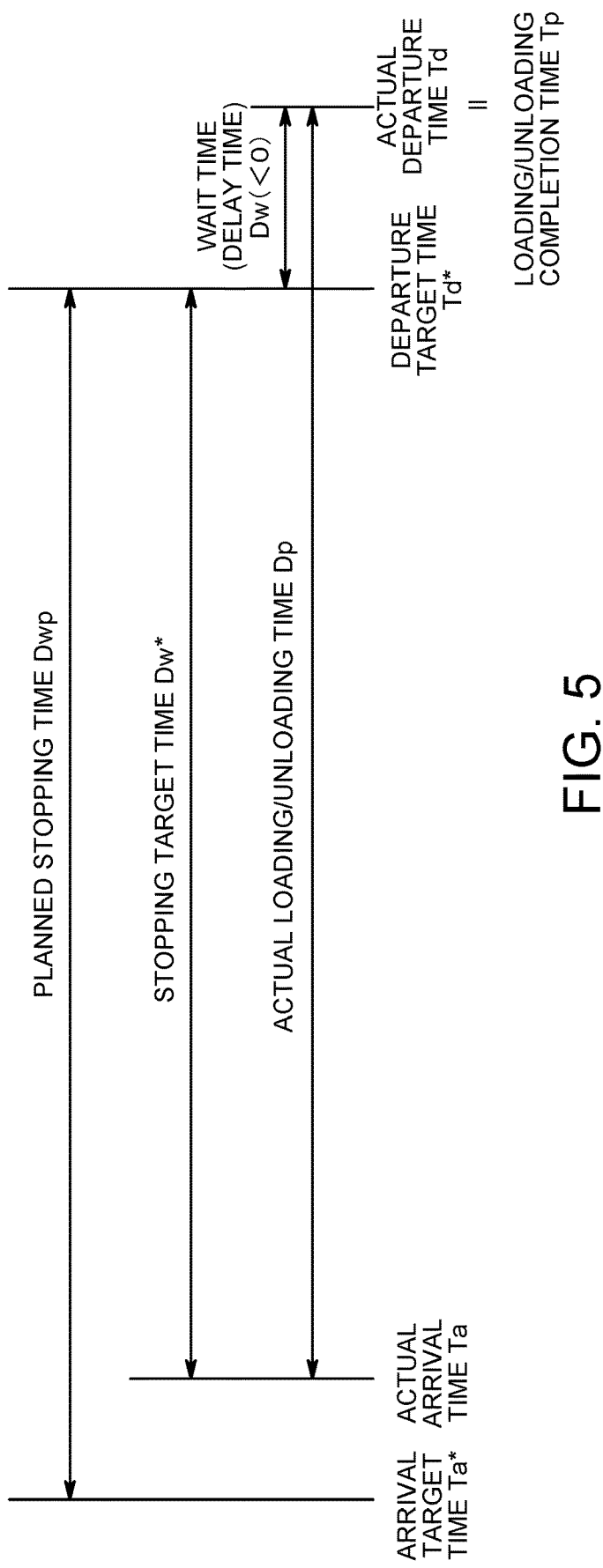
FIG. 5 is an explanatory diagram (2/2) of terms used in an operation schedule creation.

Terms which are used in the operation schedule and in the schedule change are shown in FIGS. 4 and 5. As shown in FIG. 4, in the normal operation schedule, an arrival target time Ta* at each stop ST, and a departure target time Td* at which the vehicle departs from the stop, are determined for each vehicle C. A period from the arrival target time Ta* till the departure target time Td* is a stopping time of the vehicle C on the schedule, and is called a planned stopping time Dwp.

In addition, in an actual operation, due to a delay at a previous stop, congestion on the circuit 100, or the like, the vehicle C may arrive at the stop ST at a time that is different from the arrival target time Ta*. This actual arrival time is called an actual arrival time Ta. In addition, a period from the actual arrival time Ta till the departure target time Td* is a target time for the vehicle C departing from the stop ST according to the schedule, and is called a stopping target time Dw*.

Further, an actual loading/unloading (embark/disembark) time to and from the vehicle C is called an actual loading/unloading time Dp. The actual loading/unloading time Dp is a period from the actual arrival time Ta till a loading/unloading completion time Tp. In addition, a time obtained by subtracting the actual loading/unloading time Dp from the stopping target time Dw* is called a wait time Dw.

FIG. 4 shows a case in which the wait time Dw has a positive value. In this case, the wait time Dw is a time from the loading/unloading completion time Tp to the departure target time Td*, and thus is a time in which, after the loading/unloading to and from the vehicle C is completed, the vehicle C waits for the departure. After the wait time Dw has elapsed, and the departure target time Td* is reached, the vehicle C departs from the stop. In other words, when the wait time Dw has a positive value, an actual departure time Td which is a time at which the vehicle C actually departs from the stop ST is basically equal to the departure target time Td*.

As will be described later, in a cut-in change process the wait time Dw becomes a time by which the departure target time Td* can be brought-forward (advanced), that is, a margin time.

FIG. 5 shows a case in which the actual loading/unloading time Dp is greater than the stopping target time Dw*, and the wait time Dw has a negative value. In this case, loading and unloading of the passengers continues even after the departure target time Td*, and, upon completion of the loading/unloading, the vehicle C departs immediately. Thus, the loading/unloading completion time Tp and the actual departure time Td become basically equal to each other. In this case, there is no margin for advancing the departure target time Td*.

Figure 6:
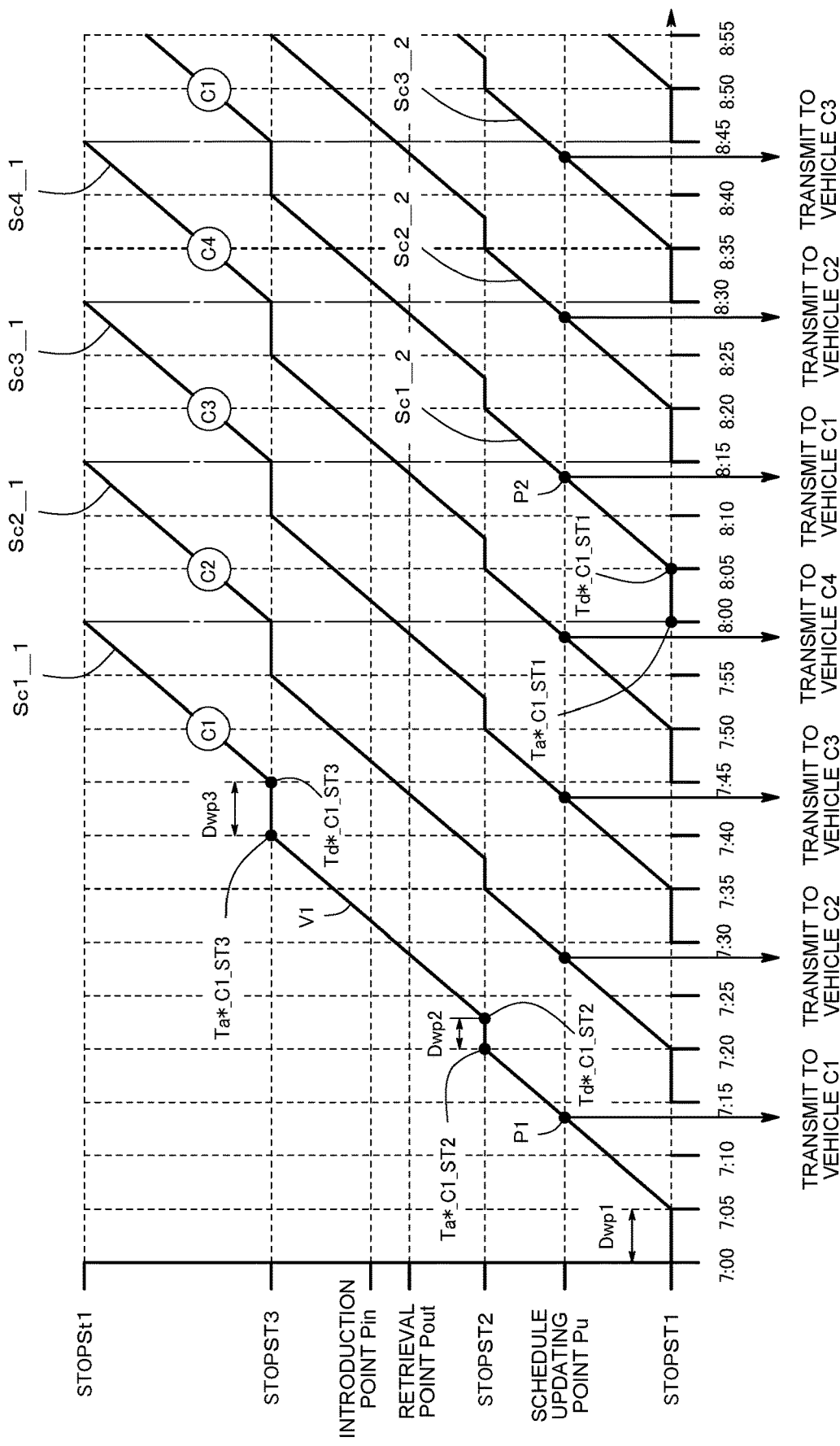
FIG. 6 is a diagram showing a normal operation schedule of each operating vehicle.

FIG. 6 is a diagram showing the normal operation schedule of each of the vehicles C1~C4. In the diagram, a horizontal axis shows time, and a vertical axis shows various locations on the circuit 100 including the stops ST1~ST3, the operation schedule updating point Pu, the retrieval point Pout, and the introduction point Pin.

In this example configuration, the target velocity is uniformly set at the velocity V1 which is a normal value, for all of the vehicles C1~C4. In addition, the planned stopping times Dwp at the stops ST1, ST2, and ST3 are respectively uniformly set at planned stopping times Dwp1, Dwp2, and Dwp3, which are normal values.

In the example configuration of FIG. 6, a schedule is planned in which the vehicles C are operated with a lap of 60 minutes and a number of vehicles of 4. Thus, an operation interval is 15 minutes. When such a diagram is created by the operation schedule creator 62 (FIG. 3) and an administrator of the operation management apparatus 10, the operation schedule is provided to each of the operating vehicles C1~C4 based on this diagram.

The operation schedule provider 63 (FIG. 3) provides, at the operation schedule updating point Pu, an operation schedule of one lap to each of the operating vehicles C1~C4 passing the updating point, only for the passing operating vehicle of the vehicles C1~C4. For example, when the operating vehicle C1 passes the operation schedule updating point Pu, the operation schedule data for the operating vehicle C1 is provided to the operating vehicle C1 from the point Pu, the operation schedule data including data until the operating vehicle C1 next passes the operation schedule updating point Pu, for example, from a point P1 to a point P2 in FIG. 6.

The operation schedule data provided to the operating vehicle C1 in this process includes arrival target times at the stops ST1~ST3, Ta*_C1_ST1~TA*_C1_ST3, departure target times from the stops ST1~ST3, Td*_C1_ST1~Td*_C1_ST3, and the setting velocity V1.

<Cut-In Change Process>

Figure 7:
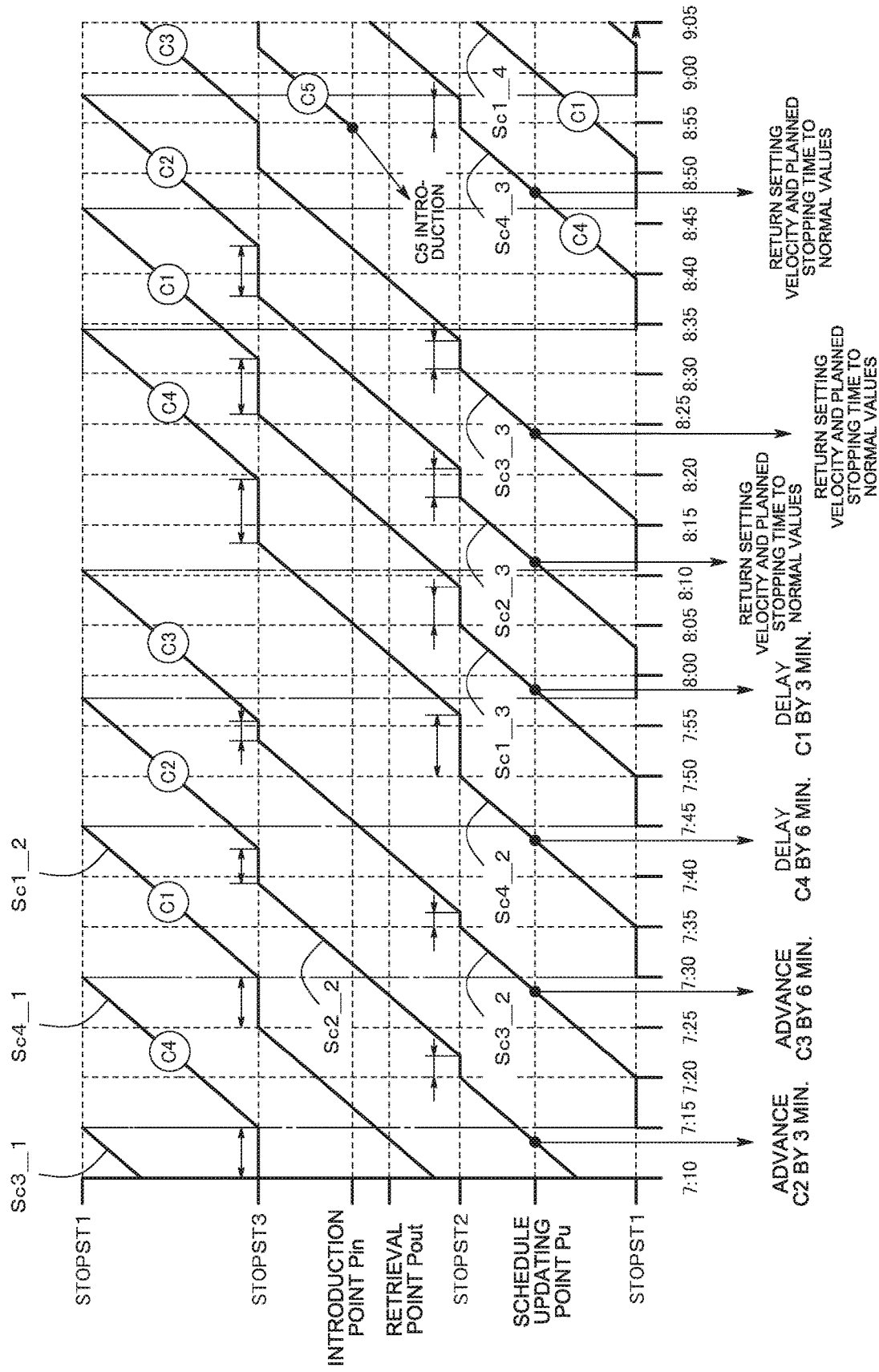
FIG. 7 is a diagram showing an example configuration of a cut-in change process, in which an introduction timing of an additional vehicle is after an operation schedule change.

FIG. 7 is a diagram for explaining a cut-in change process. In this example configuration, an operation diagram of one lap of 60 minutes, a number of vehicles of 4, and an operation interval of 15 minutes is changed to an operation diagram of one lap of 60 minutes, the number of vehicles of 5, and the operation interval of 12 minutes. The cut-in change process to be described below is executed by the operation schedule changer 61.

In changing from the normal operation diagram, first, the diagram for the case in which the operating vehicles C1~C4 are operated based on the normal operation schedule is created for a plurality of laps of the circuit 100. The cut-in change process is applied to the created diagram, and the operation schedule is changed.

For example, in the cut-in change process, the operating vehicles C1~C4 are divided into a sequence of an advanced vehicle line group and a sequence of a delayed vehicle line group. That is, a sequence of operating vehicles which travel consecutively in the front and in the rear are grouped into the advanced vehicle line group and the delayed vehicle line group. In the advanced vehicle line group, the departure target time Td* of each of the operating vehicles C is advanced from the departure target time Td* determined based on the normal operation schedule. In the delayed vehicle line group, the departure target time Td* of each of the operating vehicles C is delayed from the departure target time Td* determined based on the normal operation schedule.

For example, in the example configuration of FIG. 7, operating vehicles C2 and C3 are selected as the advanced vehicle line group. In addition, the operating vehicles C4 and C1 are selected as the delayed vehicle line group. A method of allocating the operating vehicles into the groups will be described later. With the grouping, an inter-vehicle space between the advanced vehicle line group and the delayed vehicle line group, more accurately, an inter-vehicle space between the last operating vehicle C3 of the advanced vehicle line group and the leading operating vehicle C4 of the delayed vehicle line group, is enlarged, and the additional vehicle C5 is introduced to this inter-vehicle space.

In the example configuration of FIG. 7, the operation interval of the operating vehicles C1~C4 is shortened from 15 minutes to 12 minutes. That is, the operation schedule is shortened by 3 minutes per vehicle. For example, for the operating vehicle C2 which is the leading vehicle of the advanced vehicle line, the operation schedule is advanced by 3 minutes from the normal operation schedule. This advancement is executed by advancing the departure target time Td* at each of the stops ST1~ST3 from the departure target time Td* determined based on the normal operation schedule.

For the operating vehicle C3 which follows the operating vehicle C2 as the next vehicle in the advanced vehicle line group, the operation schedule is advanced by a total of 6 minutes, in which an advancement of 3 minutes for the operating vehicle C3 is added to the advancement of 3 minutes for the operating vehicle C2 which precedes the operating vehicle C3. In general, when, for example, the advancement magnitude is t minutes, the advancement magnitude of the operating vehicle C which is an nth operating vehicle from the leading vehicle of the advanced vehicle line group is (t×n) minutes.

On the other hand, for the leading operating vehicle C4 of the delayed vehicle line group, the operation schedule is pushed back by a total of 6 minutes, in which a delay of the operating vehicle C1 following the operating vehicle C4 is added to the delay of the operating vehicle C4. Similarly, for the last operating vehicle C1, the operation schedule is pushed back by 3 minute, corresponding to the push-back of the operating vehicle C1. In general, when, for example, the push-back magnitude is t minutes and the number of operating vehicles C included in the delayed vehicle line group is n, the push-back magnitude of the leading operating vehicle C of this group is (t×n) minutes. This delay process is executed by pushing back the departure target time Td* at each of the stops ST1~ST3 from the departure target time Td* determined based on the normal operation schedule.

With reference to FIG. 7, the operation schedule changed by the operation schedule changer 61 (FIG. 3) from the normal operation schedule is provided to each of the operating vehicles C1~C4 at the operation schedule updating point Pu. After each of the operating vehicles C1~C4 has traveled the circuit 100 for one lap with the changed operation schedule, the operation schedule formed based on the normal value, that is, the normal operation schedule, is provided to each of the operating vehicles C1~C4 at the operation schedule updating point Pu.

With the change of the operation schedule, as shown by the interval between the schedules Sc3_3 and Sc4_3 after 8:10, the inter-vehicle space between the last operating vehicle C3 of the advanced vehicle line group and the leading operating vehicle C4 of the delayed vehicle line group is enlarged in comparison to the other inter-vehicle spaces. With this process, it becomes possible to introduce the additional vehicle C5 to the space between the operating vehicles C3 and C4.

Figure 8:
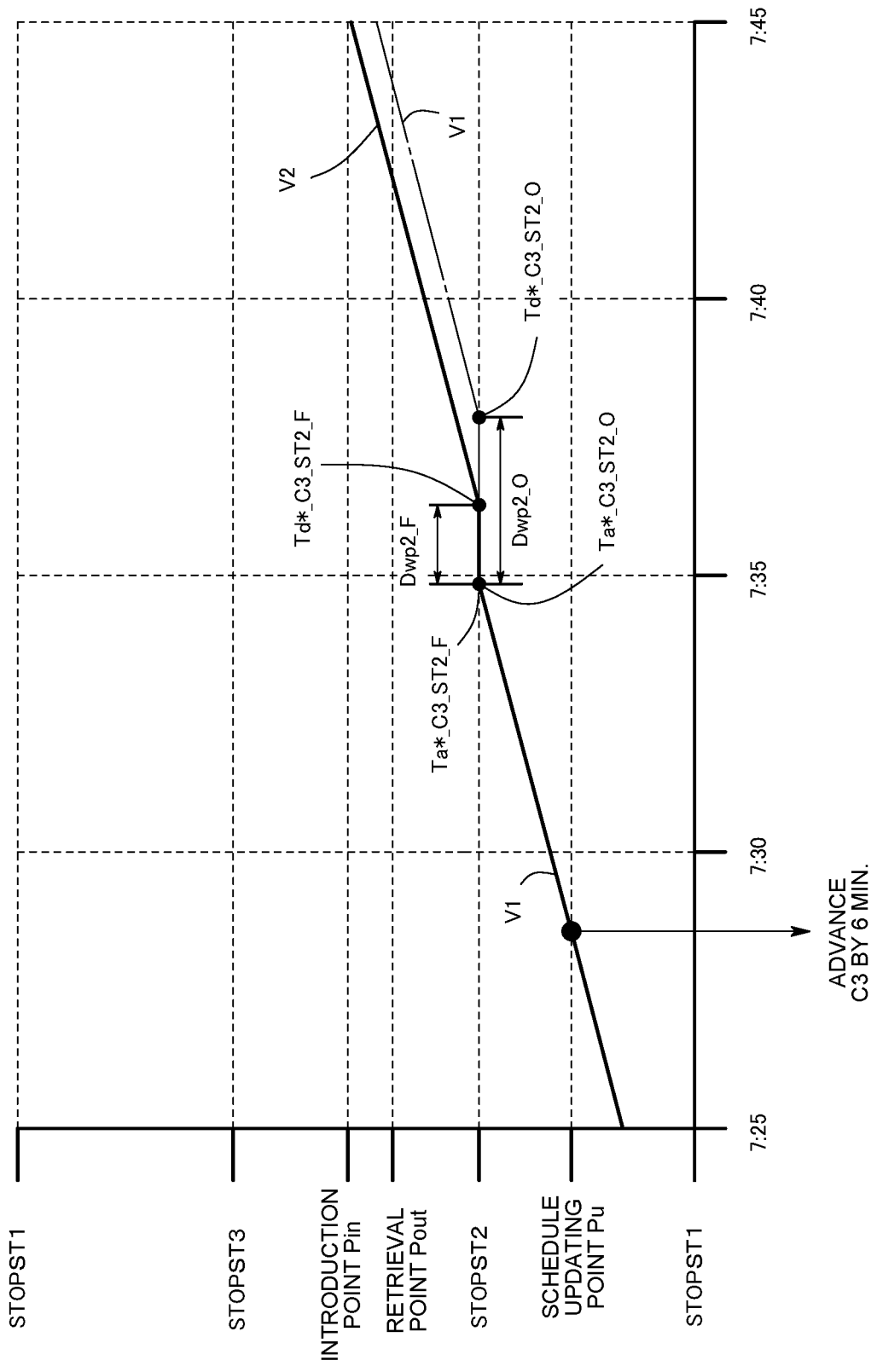
FIG. 8 is a partial enlarged view of FIG. 7 (near stop ST2), for explaining a front-load process of the cut-in change process.
Figure 9:
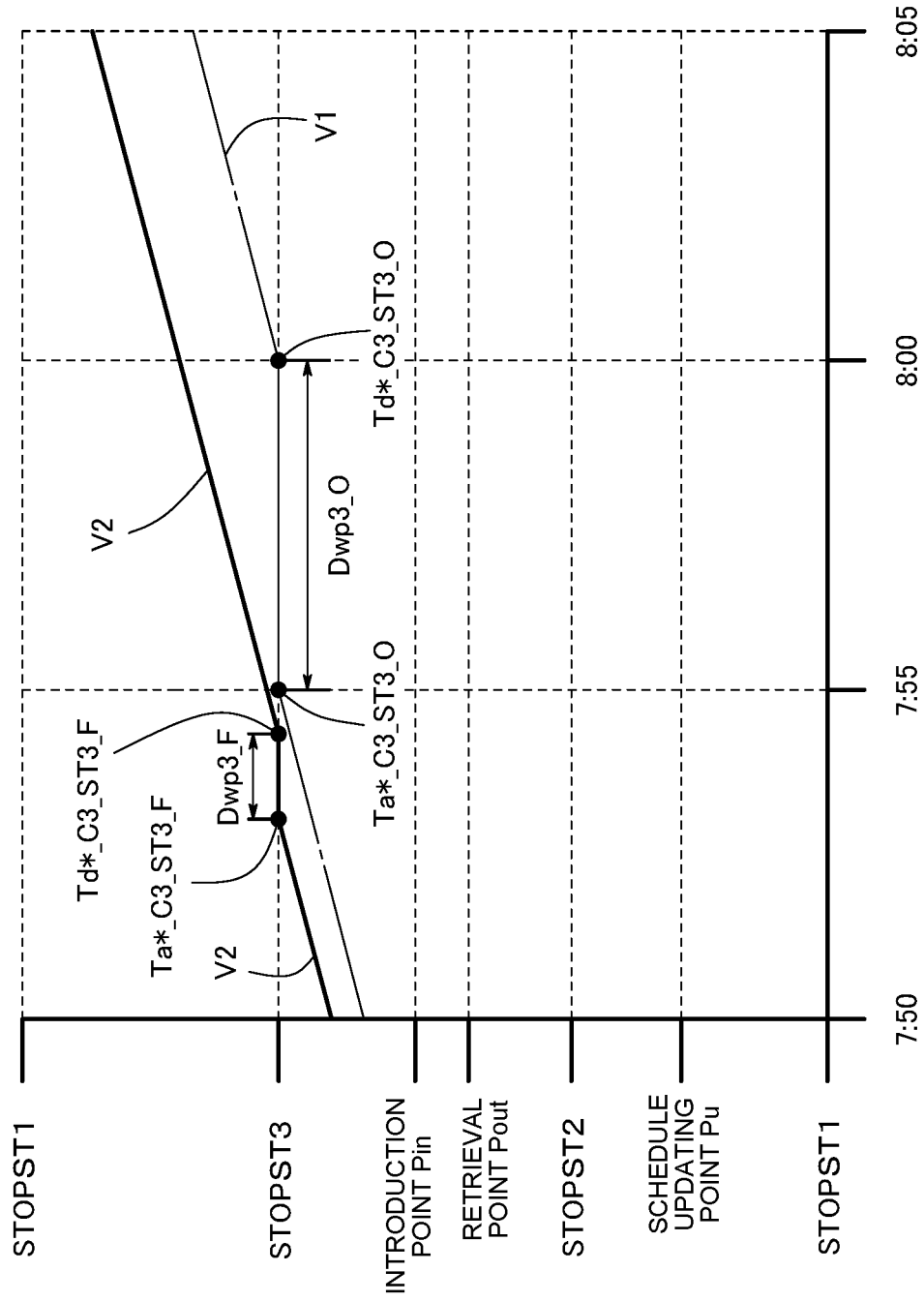
FIG. 9 is a partial enlarged view of FIG. 7 (near stop ST3), for explaining a front-load process of the cut-in change process.

FIGS. 8 and 9 are partial enlargement views of FIG. 7, and show the front-load process of the operating vehicle C3. A solid line shows a changed operation schedule, and a dot-and-chain line shows the normal operation schedule. As shown in FIG. 8, the velocity from the operation schedule updating point Pu to the stop ST2 is set at the velocity V1 both before and after the schedule change. Therefore, with regard to the arrival target time Ta* of the operating vehicle C3 to the stop ST2, the arrival target time before the operation schedule change, Ta*_C3_ST2_O and the arrival target time after the change, Ta*_C3_ST2_F, are the same time.

On the other hand, with regard to the departure target time Td*, the departure target time after the schedule change, Td*_C3_ST2_F, is set earlier than the departure target time based on the normal operation schedule, Td*_C3_ST2_O. With this process, a planned stopping time Dwp2_F after the schedule change becomes shorter than the planned stopping time Dwp2_O based on the normal operation schedule.

FIG. 9 shows a situation of the schedule change of the operating vehicle C3, before and after the stop ST3. In the example configuration of FIG. 9, the departure target time Td* is advanced at the stop ST2, and the traveling velocity from the stop ST2 to the stop ST3 is changed to V2 which is faster than V1. With these changes, the arrival target time to the stop ST3 after the schedule change, Ta*_C3_ST3_F is advanced from the arrival target time based on the normal operation schedule, Ta*_C3_ST3_O.

In addition, at the stop ST3, the departure target time Td*_C3_ST3_F is set earlier (advanced) from the departure target time based on the normal operation schedule, Td*_C3_ST3_O.

A magnitude of advancement at each of the stops ST1~ST3 may be evenly applied to the stops ST1~ST3. For example, when the advancement amplitude of 6 minutes is determined for the operating vehicle C3, the planned stopping time Dwp (refer to FIG. 4) at each of the stops ST1~ST3 is shortened by 2 minutes.

Figure 10:
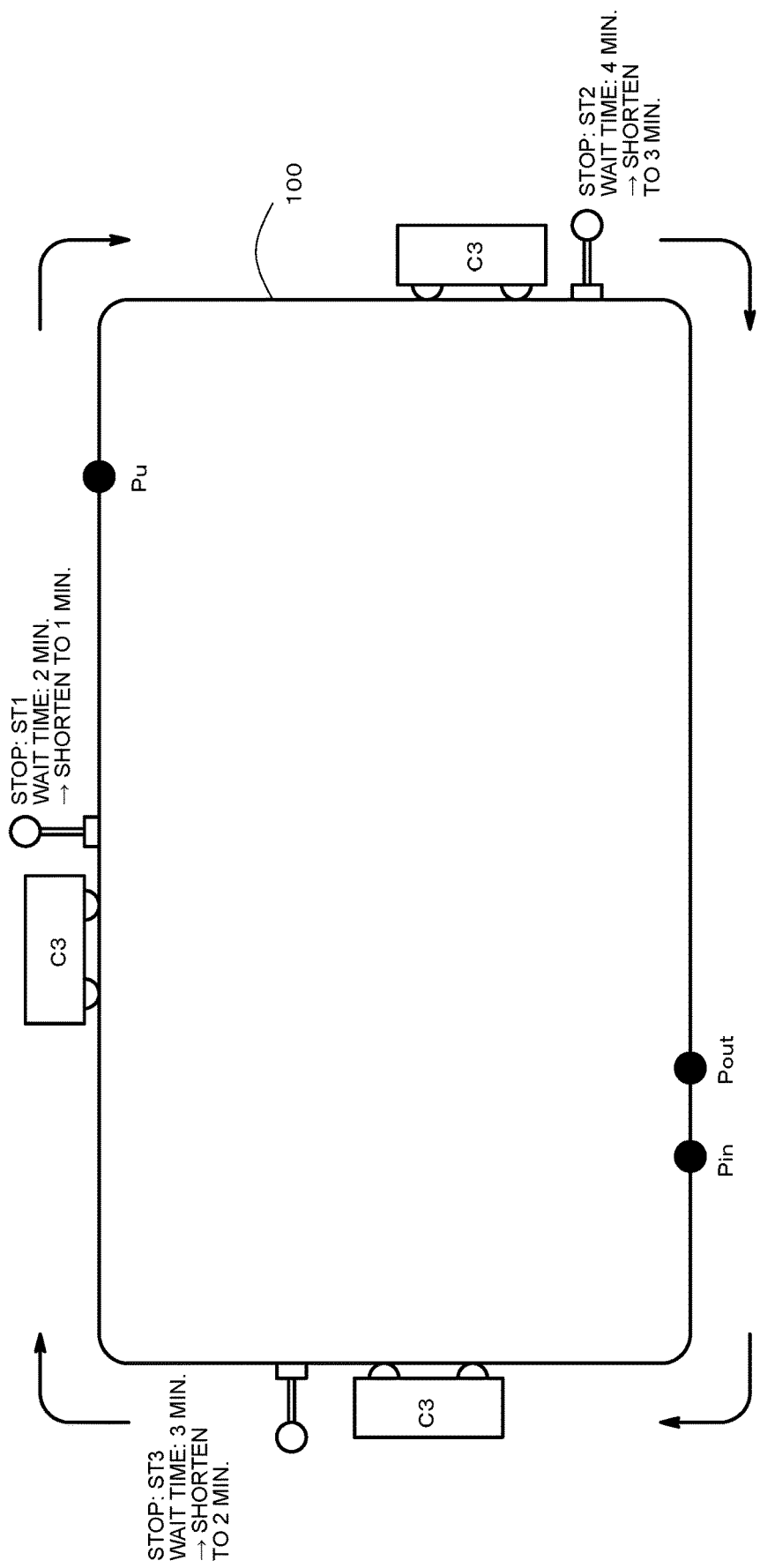
FIG. 10 is a diagram for explaining allocation of an advancement magnitude among stops.

Alternatively, as shown in FIG. 10, the advancement magnitudes at the stops ST1~ST3 may be determined according to a track record value of the wait time Dw at each of the stops ST1~ST3 in a past lap. For example, FIG. 10 shows a wait time Dw at each of the stops ST1~ST3 at a previous lap of the operating vehicle C3.

As described above, the wait time Dw shows a temporal margin in which the actual loading/unloading time Dp is subtracted from the stopping target time Dw* (refer to FIG. 4), and shows a time for which the advancement is possible. By increasing the advancement magnitude for a larger wait time Dw, an operation schedule which is realistic (which can be realized) can be created.

For example, the advancement magnitude for the operating vehicle C3 is 6 minutes. Of the stops ST1~ST3, the advancement magnitude for the stop ST2 having the longest wait time Dw (4 minutes) is set at 3 minutes. The advancement magnitude for the stop ST3 having the next longest wait time Dw after the stop ST2 (3 minutes) is set at 2 minutes. Similarly, the advancement magnitude for the stop ST1 having the shortest wait time Dw (2 minutes) is set at 1 minute.

In addition to the advancement of the departure target time Td*, the setting velocities of the operating vehicles C2~C4 may be increased. For example, in the configurations of FIGS. 8 and 9, the setting velocity of the vehicle C3 is set at the velocity V2 (>V1) from the stop ST2 to the stop ST3, and from the stop ST3 to the stop ST1.

Figure 11:
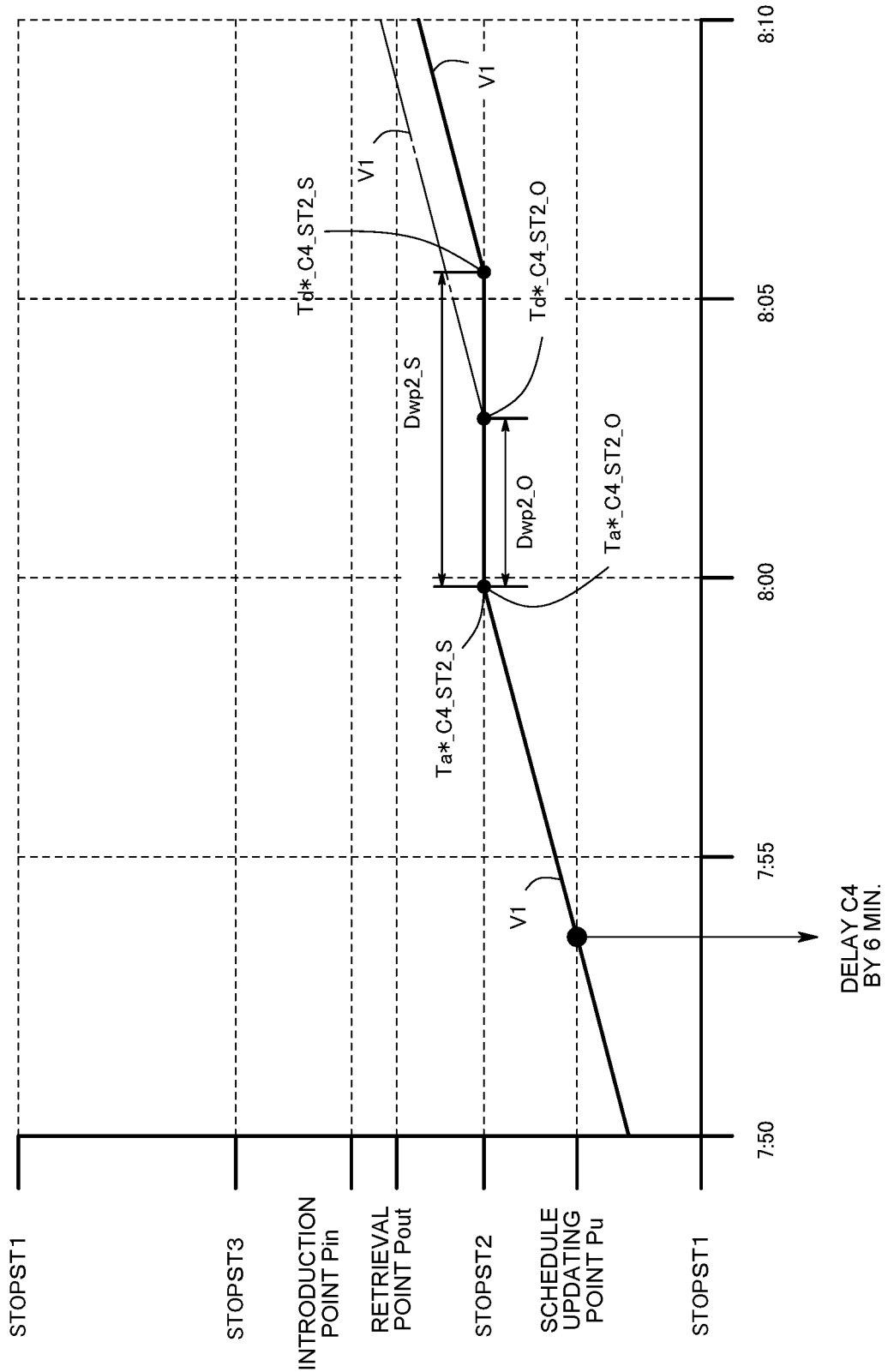
FIG. 11 is a partial enlarged view of FIG. 7 (near stop ST2), for explaining a delay process of the cut-in change process.
Figure 12:
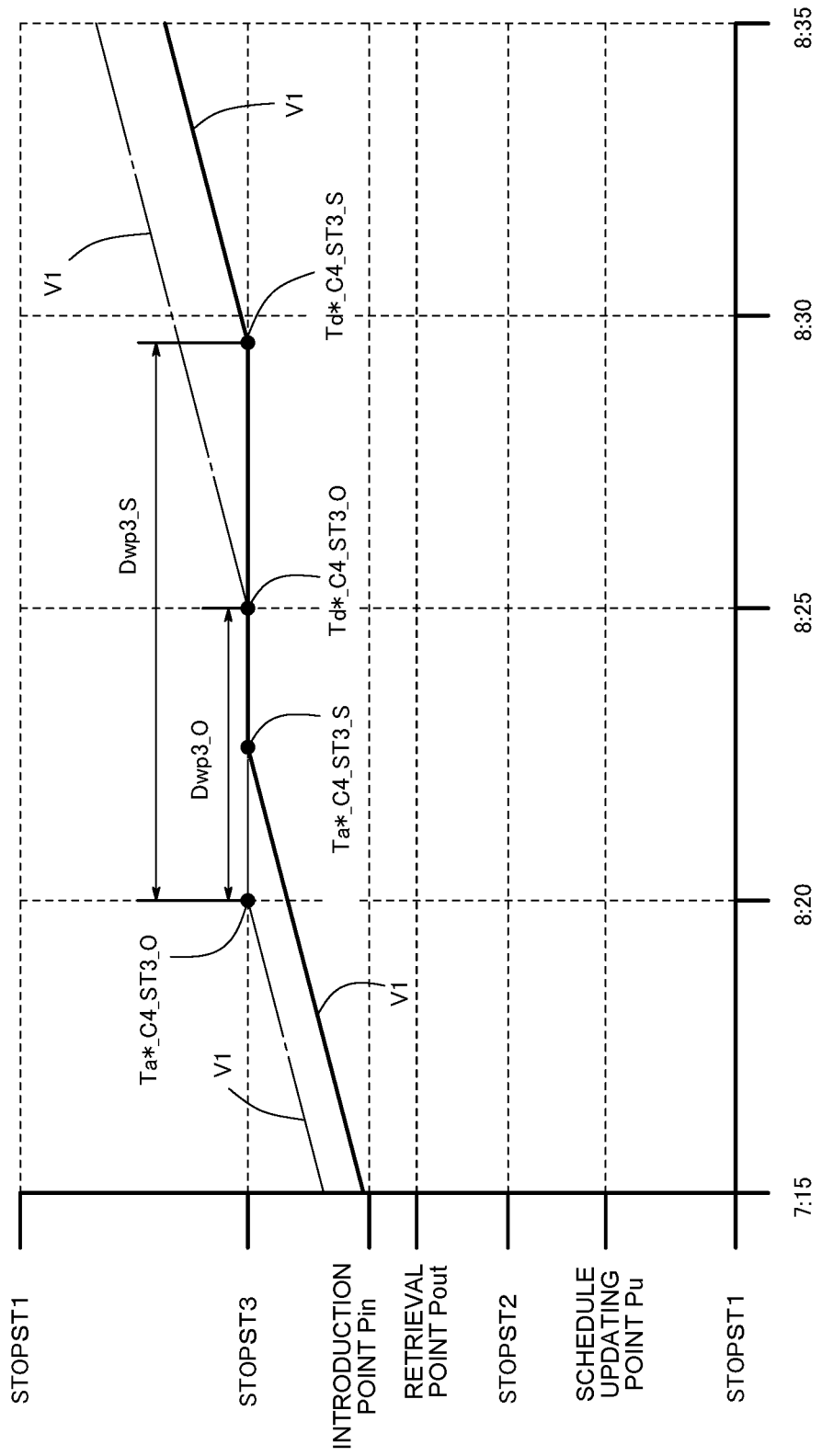
FIG. 12 is a partial enlarged view of FIG. 7 (near stop ST3), for explaining a delay process of the cut-in change process.

FIGS. 11 and 12 are partial enlarged views of FIG. 7, and show a delay process of the operating vehicle C4. A solid line shows a changed operation schedule, and a dot-and-chain line shows the normal operation schedule. As shown in FIG. 11, the velocity from the schedule updating point Pu to the stop ST2 is set at the velocity V1 before and after the schedule change. Therefore, with regard to the arrival target time Ta* of the operating vehicle C4 to the stop ST2, the arrival target time before the operation schedule change, Ta*_C4_ST2_O, and the arrival target time after the change, Ta*_C4_ST2_S, are the same time.

On the other hand, with regard to the departure target time Td*, the departure target time after the schedule change, Td*_C4_ST2_S, is delayed from the departure target time based on the normal operation schedule, Td*_C4_ST2_O. As a consequence, the planned stopping time Dwp2_S after the schedule change is longer than the planned stopping time Dwp2_O based on the normal operation schedule.

FIG. 12 shows a situation of a schedule change of the operating vehicle C4, before and after the stop ST3. In the exemplified configuration, the departure target time Td* is pushed back at the stop ST2. The traveling velocity from the stop ST3 to the stop ST4 is maintained at V1. With the push-back of the departure target time Td*, the arrival target time at the stop ST3 after the schedule change, Ta*_C4_ST3_S, is delayed from the arrival target time based on the normal operation schedule, Ta*_C4_ST3_O.

In addition, at the stop ST3, the departure target time Td*_C4_ST3_S is delayed (pushed back) from the departure target time based on the normal operation schedule, Td*_C4_ST3_O.

The push-back magnitude at each of the stops ST1~ST3 may be applied evenly for the stops ST1~ST3. For example, when a push-back magnitude of 6 minutes is determined for the operating vehicle C4, each of the planned stopping times Dwp (refer to FIG. 4) at the stops ST1~ST3 is shortened by 2 minutes. Alternatively, similar to FIG. 10, the push-back magnitude at each of the stops ST1~ST3 may be determined according to a track record value of the wait time Dw for each of the stops ST1~ST3 in a past lap.

<Schedule Change Process>

Figure 13:
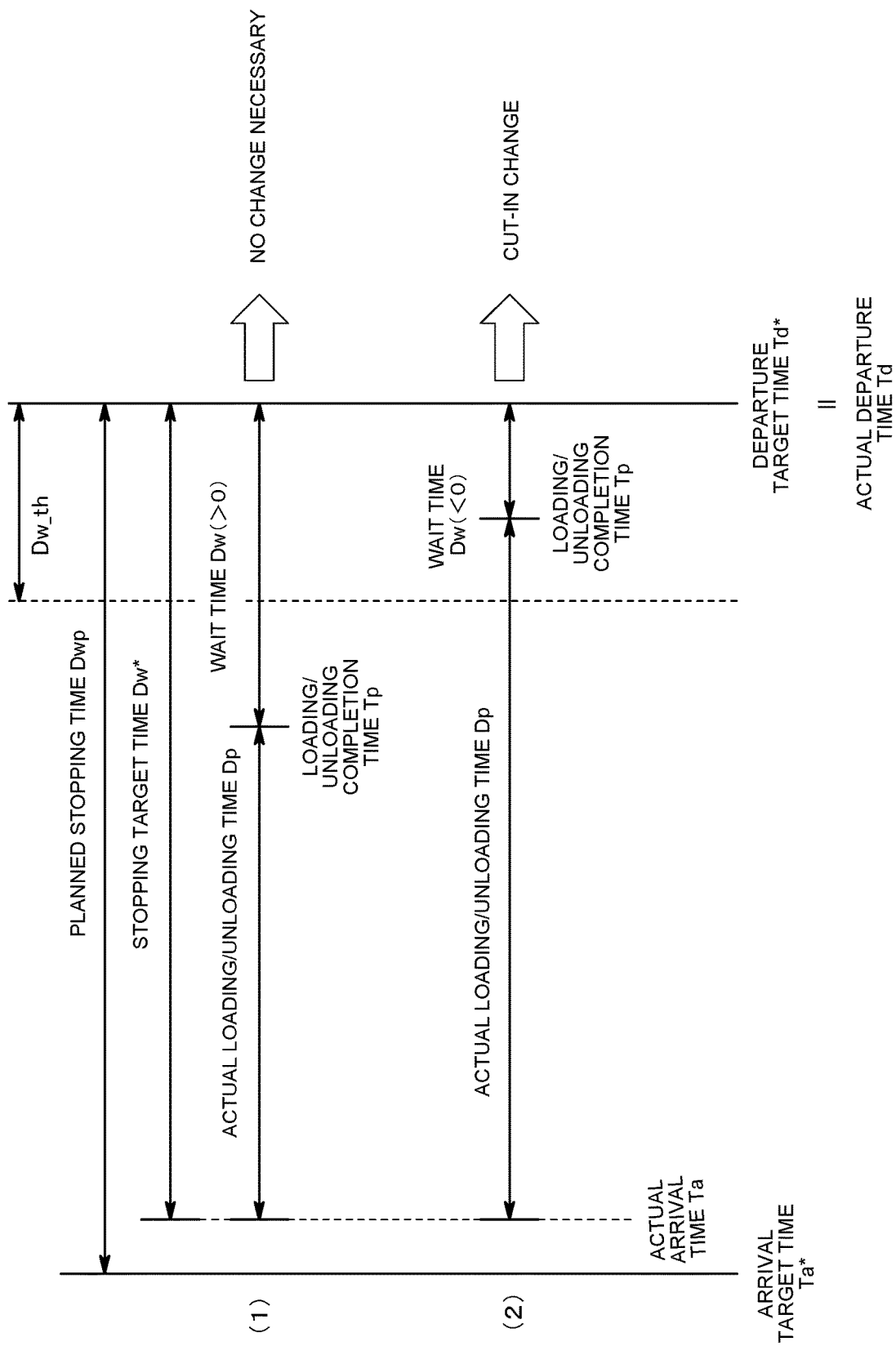
FIG. 13 is a diagram for explaining an overview of a schedule change process.

FIG. 13 shows an overview of a schedule change process by the operation management apparatus 10. This change process is repeatedly executed with a predetermined time interval. In the change process, the wait time Dw is used as a parameter for judging the boarding demand (boarding demand parameter). As will be described below in detail, the introduction judgment unit 68 (FIG. 3) judges whether or not the additional vehicle is to be introduced based on the wait time Dw. When the introduction of the additional vehicle is decided, the operation schedule changer 61 (FIG. 3) executes the cut-in change process based on the wait time Dw.

As the wait time Dw becomes larger (larger on the positive side), the time required for loading and unloading is shorter; that is, the number of passengers is smaller, meaning a lower boarding demand. On the contrary, when the wait time Dw reaches 0 or becomes negative, the time required for loading and unloading is long, and the number of passengers is large, meaning a higher boarding demand.

As a threshold for judging the highness/lowness of the boarding demand, a threshold Dw_th (>0) is used. For example, the threshold Dw_th is determined to be a value of about 15% of the planned stopping time Dwp. When the wait time Dw is greater than the threshold Dw_th, it is judged that the transport (or boarding demand) can be covered by the vehicles C currently in operation, without requiring addition of another vehicle (FIG. 13(1)).

On the other hand, when the wait time Dw is less than or equal to the threshold Dw_th, it is judged that the introduction of the additional vehicle is necessary, and the cut-in change process is executed (FIG. 13(2)). Further, as will be described below, a number of operating vehicles in the advanced vehicle line group is determined according to a length of the wait time Dw.

Figure 14:
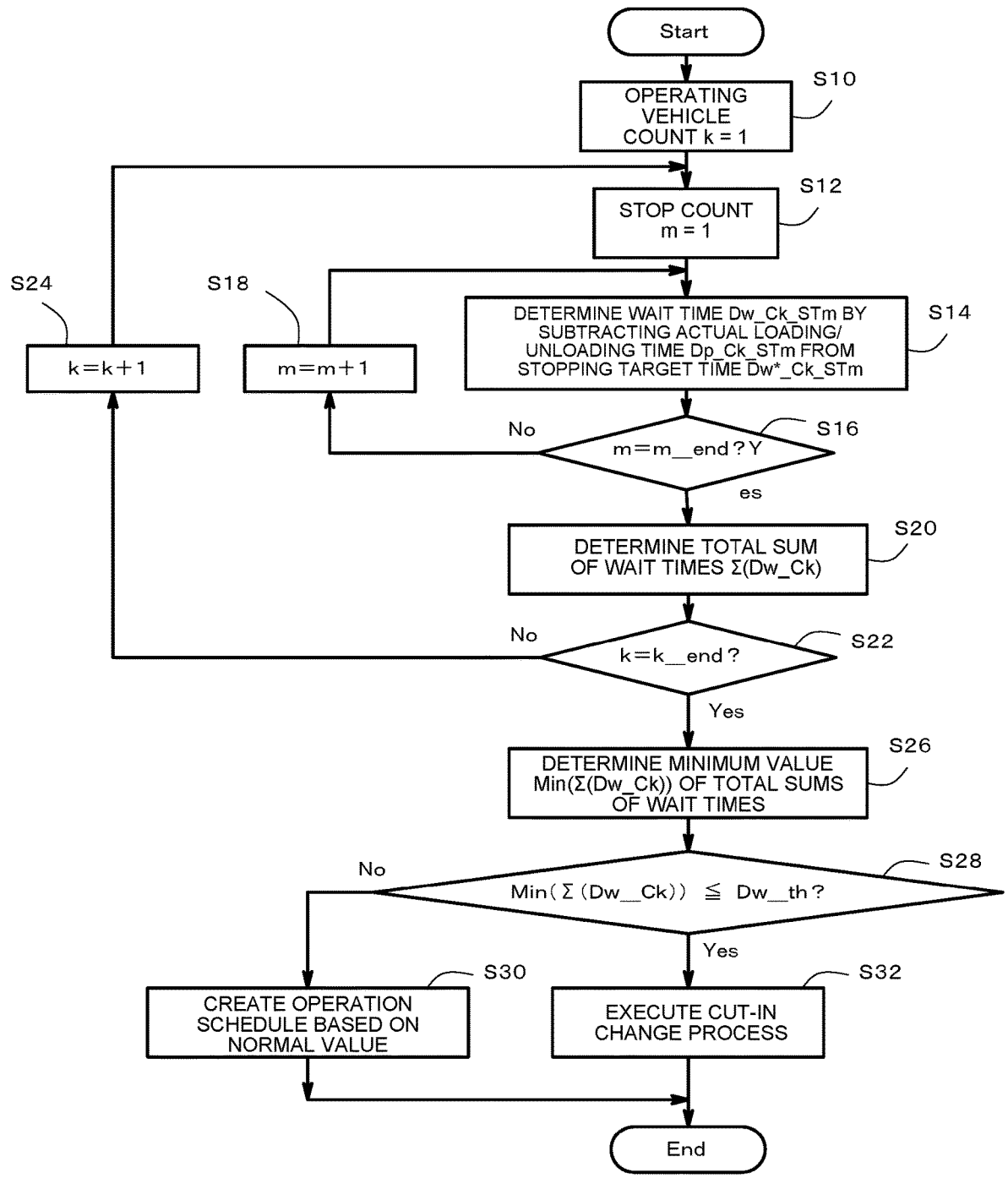
FIG. 14 is a flowchart showing a schedule change process flow.

FIG. 14 shows a schedule change process flow by the operation management apparatus 10. In this flow, in order to determine a wait time for one lap of the circuit 100, the threshold Dw_th is determined based on a total sum of the planned stopping times Dwp at the stops ST1~ST3. This flow is repeatedly executed at a predetermined interval. For example, the schedule change process flow shown in FIG. 14 is executed every time the operating vehicle passes the schedule updating point Pu. As shown in FIG. 7, the schedule change process flow of FIG. 14 may be suspended in a lap based on the operation schedule changed by the cut-in process and the next lap in which the additional vehicle is introduced.

For example, the total sum of the planned stopping times Dwp at the stops ST1~ST3 is determined for each of the operating vehicles C1~C4, and an average value of these total sums is set as a reference value. A value which is about 15% of the reference value is set as the threshold Dw_th.

The boarding demand judgment unit 60 (FIG. 3) sets an operating vehicle count k to an initial value of 1 (S10). That is, a target for which the wait time is to be determined is set to the operating vehicle C1. Next, the boarding demand judgment unit 60 sets a stop count m to an initial value (S12). That is, the target for which the wait time is to be determined is set to the time when the operating vehicle C1 stops at the stop ST1.

The boarding demand judgment unit 60 acquires, from the operating vehicle C1, the actual arrival time Ta_C1_ST1 to the stop ST1, the loading/unloading completion time Tp_C1_ST1, and the departure target time Td*_C1_ST1 from the stop ST1. Further, the boarding demand judgment unit 60 determines the stopping target time Dw*_C1_ST1 from the actual arrival time Ta_C1_ST1 and the departure target time Td*_C1_ST1. In addition, the boarding demand judgment unit 60 determines the actual loading/unloading time Dp_C1_ST1 from the actual arrival time Ta_C1_ST1 and the loading/unloading completion time Tp_C1_ST1. Moreover, the boarding demand judgment unit 60 subtracts the actual loading/unloading time Dp_C1_ST1 from the stopping target time Dw*_C1_ST1, to determine the wait time Dw_C1_ST1 (S14).

The boarding demand judgment unit 60 then judges whether or not the stop count m has reached a final value m_end (S16). When the stop count m has not reached the final value m_end, the boarding demand judgment unit 60 increments the stop count m (S18), returns to step S14, and determines the wait time for the next stop.

When it is judged that the stop count m has reached the final value m_end, the boarding demand judgment unit 60 determines a total sum Σ(Dw_C1) of the wait times of one lap of the circuit 100, that is, wait times of all stops ST1~ST3, for the operating vehicle Ck (S20). Next, the boarding demand judgment unit 60 judges whether or not the operating vehicle count k has reached a final value k_end (S22). When the final value k_end has not been reached, the operating vehicle count k is incremented (S24), and the process returns to step S12.

When it is judged in step S22 that the operating vehicle count k has reached the final value k_end, the introduction judgment unit 68 judges whether or not a representative value of a one-lap wait time Σ(Dw_Ck) of the operating vehicles C1~C4 is less than or equal to the threshold Dw_th.

For example, as the representative value, a minimum value of the one-lap wait time, Min(Σ(Dw_Ck)), is selected. The boarding demand judgment unit 60 determines the minimum value Min(Σ(Dw_Ck)) among the one-lap wait times Σ(Dw_Ck) of the operating vehicles C1~C4 (S26). Alternatively, in place of the minimum value being the representative value, an average value may be employed as the representative value.

The introduction judgment unit 68 acquires the minimum value Min(Σ(Dw_Ck)) from the boarding demand judgement unit 60. The introduction judgment unit 68 judges whether or not the acquired value is less than or equal to the threshold Dw_th (S28). When the minimum value Min(Σ(Dw_Ck)) is greater than the threshold Dw_th, it is judged that there is a sufficient wait time, and the boarding demand is low, and introduction of the additional vehicle is put off. With this judgment, the operation schedule based on the normal value, that is, the normal operation schedule, is created (S30).

On the other hand, when the minimum value Min(Σ(Dw_Ck)) is less than or equal to the threshold Dw_th, the introduction judgment unit 68 decides on introduction of the additional vehicle C5 to the circuit 100. A notification of the decision is sent to the operation schedule changer 61.

When the operation schedule changer 61 receives the decision notification, when creating the operation schedule of the operating vehicle expected to pass the schedule updating point Pu after the current judgment time, the operation schedule changer 61 changes the operation schedule from the normal operation schedule, for introduction of the additional vehicle C5. For this change, the operation schedule changer 61 executes the cut-in change process (S32).

<Cut-in Change Process Flow>

Figure 15:
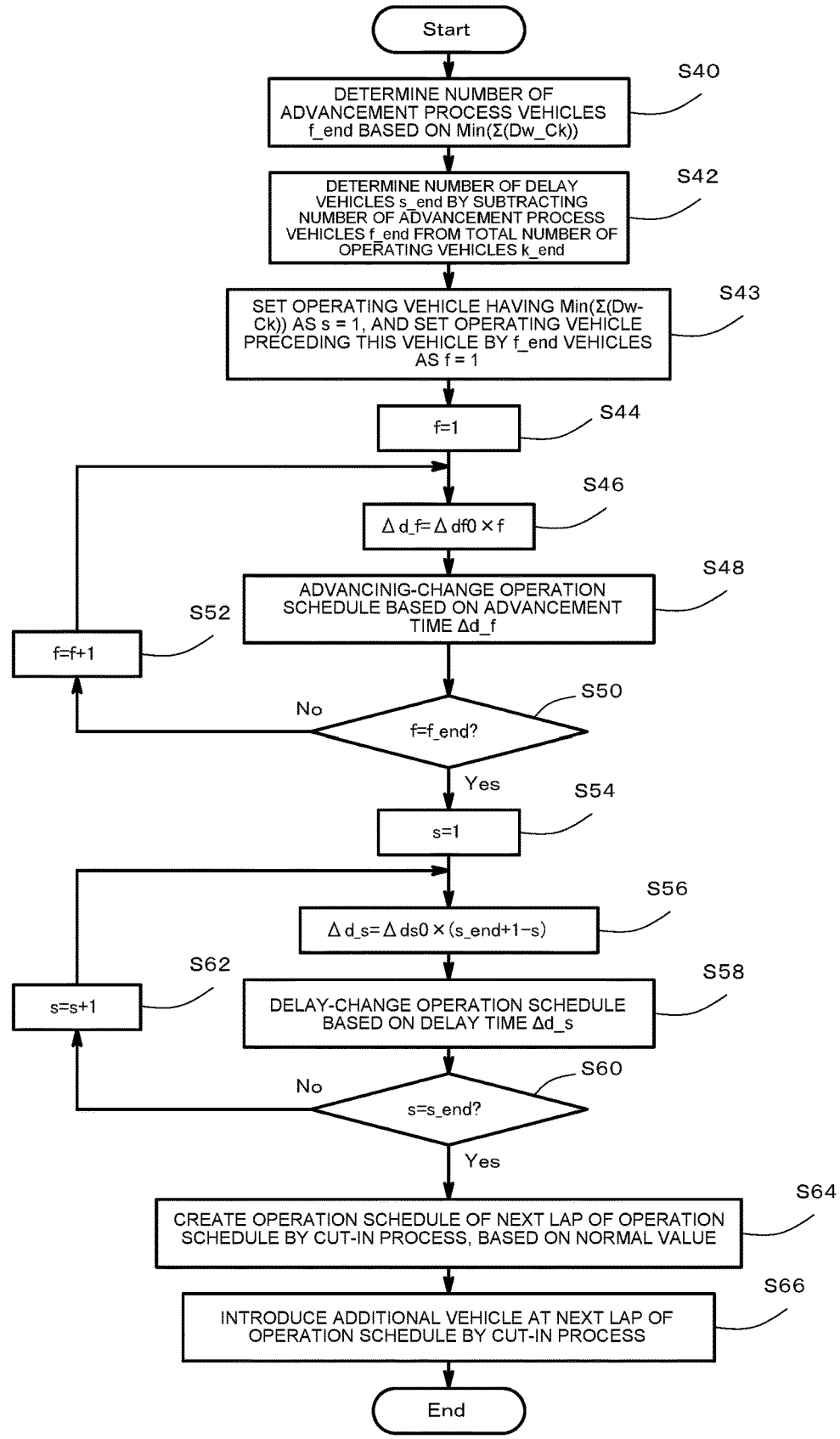
FIG. 15 is a flowchart showing a cut-in change process flow.
Figure 16:
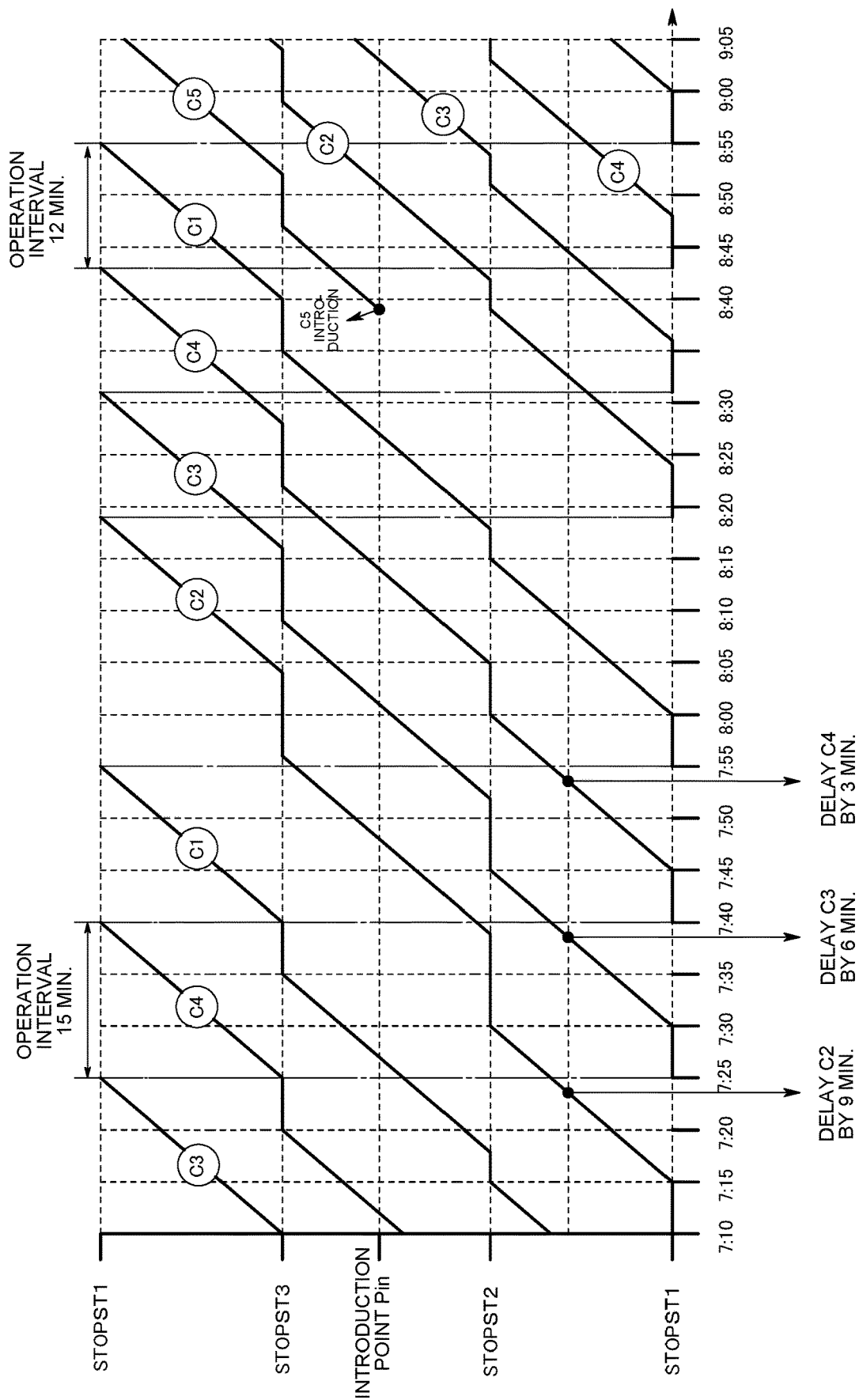
FIG. 16 is a diagram exemplifying a schedule change at a time of introduction of an additional vehicle in the related art.

FIG. 15 shows a cut-in change process flow executed by the operation schedule changer 61. In this flow, a number of the operating vehicles C included in the advanced vehicle line group and a number of the operating vehicles C included in the delayed vehicle line group are determined. Further, the advancement magnitude and the push-back magnitude of the departure target time Td* determined for each of the operating vehicles C are determined.

The operation schedule changer 61 determines a number of the operating vehicles C included in the advanced vehicle line group, f_end, based on the minimum value Min(Σ(Dw_Ck)) which is the representative value of the one-lap wait times Σ(Dw_Ck) which are total sums of the wait times of the operating vehicles C1~C4 (S40). As exemplified in FIG. 7, in the advancement change process, the advancement(s) of the preceding vehicle(s) is (are) reflected (accumulated) for the following vehicles, and the advancement magnitude of the departure target time Td* becomes larger for later vehicles. Thus, in step S40, an adjustment is applied so that the advancement magnitude of the last vehicle C of the advanced vehicle line group does not exceed the minimum value Min(Σ(Dw_Ck)).

For example, in this step, a product of the number of vehicles in the advanced vehicle line group, f_end, and an initial advancement magnitude Δdf0 which is determined in advance is determined (f_end×Δdf0). Further, a maximum value (Max(f_end), wherein f_end×Δdf0<Min(Σ(Dw_Ck))) of the number of vehicles f_end is determined within a range of less than the minimum value Min(Σ(Dw_Ck)). The determined number of vehicles f_end is the number of vehicles of the advanced vehicle line group. A remaining number of the operating vehicles is determined as the number of vehicles of the delayed vehicle line group.

In addition, the operation schedule changer 61 determines a number of vehicles of the delayed vehicle line group, s_end, by subtracting the number of vehicles of the advanced vehicle line group, f_end, from a total number of operating vehicles traveling on the circuit 100 at the current time, k_end (S42).

Based on the number of vehicles of the advanced vehicle line group f_end and the number of vehicles of the delayed vehicle line group s_end thus determined, the operating vehicles C traveling on the circuit 100 are divided into the advanced vehicle line group and the delayed vehicle line group.

The operation schedule changer 61 sets an operating vehicle C, among all of the operating vehicles C, having the shortest one-lap wait time, that is, the minimum value Min($\Sigma$(Dw−Ck)), as a leading vehicle (s=1) of the delayed vehicle line group (S43).

As described above, the push-back magnitude of the departure target time Td* of the leading vehicle of the delayed vehicle line group is the longest within the group. With the push-back of the departure target time Td*, the wait time Dw is extended. By setting the operating vehicle C having the shortest one-lap wait time as the leading vehicle of the delayed vehicle line group, excessive extension of the wait time of this vehicle can be suppressed.

Further, the operation schedule changer 61 includes operating vehicles C from the leading vehicle (s=1) of the delayed vehicle line group to the operating vehicle of s_end sequentially following the leading vehicle, in the delayed vehicle line group.

Moreover, the operation schedule changer 61 sets an operating vehicle which precedes the operating vehicle C which is set as the leading vehicle of the delayed vehicle line group by f_end vehicles as a leading vehicle (f=1) of the advanced vehicle line group (S43). The operation schedule changer 61 then includes the operating vehicles C from the leading vehicle (f=1) of the advanced vehicle line group to the operating vehicle of f_end sequentially following the leading vehicle, in the advanced vehicle line group.

Next, the operation schedule changer 61 sets a vehicle number count f of the advanced vehicle line group to an initial value (f=1) (S44). For example, in FIG. 7, the operation schedule of the operating vehicle C2 of f=1 is set as a change target. For example, a time when the operating vehicle C2 next passes the schedule updating point Pu after the current time is determined, and the operation schedule after the passing time is changed.

The operation schedule changer 61 determines an advancement magnitude $\Delta d\_f$ which is a product of a predetermined initial advancement magnitude $\Delta df0$ and the vehicle number count f (S46). As the initial advancement magnitude $\Delta df0$, for example, an advancement magnitude for one lap of the circuit 100 is determined.

The operation schedule changer 61 advances the departure target time Td* by the determined advancement magnitude $\Delta d\_f$, from the departure target time based on the normal operation schedule, which is set for an fth operating vehicle C of the advanced vehicle line group (S48).

The operation schedule changer 61 judges whether or not the vehicle number count of the advanced vehicle line group, f, has reached a final value f_end (S50). When the vehicle number count f has not reached the final value f_end, the operation schedule changer 61 increments the vehicle number count f (S52), and returns to step S46.

On the other hand, when it is judged in step S50 that the vehicle number count f has reached the final value f_end, the operation schedule changer 61 sets a vehicle number count of the delayed vehicle line group, s, to an initial value (S54).

The operation schedule changer 61 determines a push-back magnitude $\Delta d\_s$ which is a product of a number obtained by subtracting the vehicle number count s from the number of vehicles of the delayed vehicle line group s_end plus 1, and an initial push-back magnitude $\Delta ds0$ which is determined in advance (S56). As the initial push-back magnitude $\Delta ds0$, for example, a push-back magnitude for one lap of the circuit is determined.

The operation schedule changer 61 pushes back the departure target time Td* by the determined push-back magnitude $\Delta d\_s$ from the departure target time based on the normal operation schedule, which is set for an sth operating vehicle C of the delayed vehicle line group (S58).

In addition, the operation schedule changer 61 judges whether or not the vehicle number count of the delayed vehicle line group, s, has reached the final value s_end (S60). When the vehicle number count s has not reached the final value s_end, the operation schedule changer 61 increments the vehicle number count s (S62), and returns to step S56.

On the other hand, when it is judged in step S60 that the vehicle number count s has reached the final value s_end, the operation schedule changer 61 creates the operation schedule of a next lap (introduction lap) after a lap for which the operation schedule by the cut-in process is applied, based on the normal value (S64).

The operation schedule changer 61 also causes the operation schedule creator 62 to create an operation schedule for the additional vehicle C5, in addition to the operating vehicles C1~C4 (refer to FIG. 7) as the operation schedule for the introduction. The schedule is provided to the additional vehicle C5 through the operation schedule provider 63. For example, a normal operation schedule from the introduction point Pin to the operation schedule updating point Pu is provided to the additional vehicle C5.

With the execution of the operation based on the operation schedule changed by the cut-in change process, an inter-vehicle space for the additional vehicle C5 is secured. At the next lap (introduction lap), the additional vehicle C5 is introduced to the circuit 100 (S66).

<Alternative Configuration of Operation Schedule Change>

In the above-described embodiment, the application of the schedule changed from the normal operation schedule is limited to one lap of the circuit 100, but the operation management apparatus of the present disclosure is not limited to such a configuration. For example, the changed schedule may be applied for a plurality of laps. For example, when the advancement magnitude for a predetermined operating vehicle is 9 minutes, the advancement process may be executed over 3 laps, 3 minutes per lap.

Further, in the above-described embodiment, the number of operating vehicles C in the advanced vehicle line group and the number of operating vehicles C in the delayed vehicle line group are changed according to the wait time, but the operation management apparatus of the present disclosure is not limited to such a configuration. For example, half of the plurality of operating vehicles C traveling on the circuit 100 may be set as the advanced vehicle line group, and the remaining half may be set as the delayed vehicle line group. With such a grouping, adjustment of the numbers of vehicles of the groups according to the wait time becomes unnecessary, enabling the cut-in change process to be executed more quickly.

The present disclosure is not limited to the present embodiments described above, and includes all changes and modifications without departing from the technical scope or the essence of the present disclosure defined by the claims.

The invention claimed is:

1. An operation management apparatus of a plurality of autonomous travel vehicles which travel autonomously on a fixed circuit having a plurality of fixed, predetermined stops, the operation management apparatus comprising:
a computer having at least a hardware processor and memory, the computer configured to:
provide, to each of a plurality of operating vehicles of the plurality of autonomous travel vehicles that are traveling autonomously on the circuit, a first set of data signals identifying an arrival target time and a departure target time to and from each of the plurality of stops provided on the circuit;
determine whether or not an additional vehicle of the plurality of autonomous travel vehicles is to be inserted into the circuit based on a boarding demand on the circuit, the boarding demand being determined from an actual loading/unloading time of passengers onto/from the operating vehicles at the stops provided on the circuit; and
when the computer determines to insert the additional vehicle into the circuit, the computer divides the plurality of operating vehicles traveling on the circuit into an advanced vehicle line group and a delayed vehicle line group,
(a) provides a second set of data signals different from the first set of data signals to the advanced vehicle line group in which the departure target time for at least some of the stops are advanced from the departure target times identified by the first set of data signals,
(b) provides a third set of data signals different from the first set of data signals to the delayed vehicle line group in which the departure target time for at least some of the stops are delayed from the departure target times identified by the first set of data signals, and
(c) instructs the additional vehicle to enter the circuit at an inter-vehicle space between the advanced vehicle line group and the delayed vehicle line group that has been enlarged for insertion of the additional vehicle, and provides the additional vehicle with a fourth set of data signals identifying an arrival target time and a departure target time to and from each of the plurality of stops provided on the circuit.

2. The operation management apparatus according to claim 1, wherein
the computer is configured to set, as a leading vehicle of the delayed vehicle line group, an operating vehicle, among all of the operating vehicles, having a shortest one-lap wait time, which is a total sum, for one lap of the circuit, of wait times which are times from loading/unloading completion times to the departure target times at the stops.

3. The operation management apparatus according to claim 2, wherein
the computer is configured to determine a number of the operating vehicles included in the advanced vehicle line group based on the one-lap wait time determined for each of the operating vehicles, and determine a remaining number of the operating vehicles as a number of vehicles of the delayed vehicle line group.

4. The operation management apparatus according to claim 3, wherein
the computer is configured to determine an advancement magnitude of the departure target time at each of the stops according to a track record value of the wait time, at each of the stops, of each of the operating vehicles included in the advanced vehicle line group.

5. An operation management method of a plurality of autonomous travel vehicles which travel autonomously on a fixed circuit having a plurality of fixed, predetermined stops, the method being executed by a computer having at least a hardware processor and memory, the method comprising:
providing, to each of a plurality of operating vehicles of the plurality of autonomous vehicles that are traveling autonomously on the circuit, a first set of data signals identifying an arrival target time and a departure target time to and from each of the plurality of stops provided on the circuit;
determining whether or not an additional vehicle of the plurality of autonomous vehicles is to inserted into the circuit based on a boarding demand on the circuit, the boarding demand being determined from an actual loading/unloading time of passengers onto/from the operating vehicles at the stops provided on the circuit;
when the computer determines to insert the additional vehicle into the circuit, dividing the plurality of operating vehicles traveling on the circuit into an advanced vehicle line group and a delayed vehicle line group; and
(a) providing a second set of data signals different from the first set of data signals to the advanced vehicle line group in which the departure target times for at least some of the stops are advanced from the departure times identified by the first set of data signals,
(b) providing a third set of data signals different from the first set of data signals to the delayed vehicle line group in which the departure target time for at least some of the stops are delayed from the departure target times identified by the first set of data signals, and
(c) instructing the additional vehicle to enter the circuit at an inter-vehicle space between the advanced vehicle line group and the delayed vehicle line group that has been enlarged for insertion of the additional vehicle, and providing the additional vehicle with a fourth set of data signals identifying an arrival target time and a departure target time to and from each of the plurality of stops provided on the circuit.

6. The operation management method according to claim 5, further comprising:
setting an operating vehicle, among all of the operating vehicles, having a shortest one-lap wait time, which is a total sum, for one lap of the circuit, of wait times which are times from loading/unloading completion times to the departure target times at the stops, as a leading vehicle of the delayed vehicle line group.

7. The operation management method according to claim 6, further comprising:
determining a number of the operating vehicles included in the advanced vehicle line group based on the one-lap wait time determined for each of the operating vehicles, and determining a remaining number of the operating vehicles is as a number of vehicles of the delayed vehicle line group.

8. The operation management method according to claim 7, further comprising:
determining an advancement magnitude of the departure target time at each of the stops according to a track record value of the wait time, at each of the stops, of each of the operating vehicles included in the advanced vehicle line group.

9. The operation management apparatus according to claim 1, wherein
   the computer determines that the additional vehicle is to be inserted into the circuit when a representative value of a wait time of the operating vehicles is less than or equal to a threshold wait time, the representative value of the wait time being obtained by subtracting the actual loading/unloading time of the operating vehicles from a stopping target time of the operating vehicles.

10. The operation management method according to claim 5, wherein
   the computer determines that the additional vehicle is to be inserted into the circuit when a representative value of a wait time of the operating vehicles is less than or equal to a threshold wait time, the representative value of the wait time being obtained by subtracting the actual loading/unloading time of the operating vehicles from a stopping target time of the operating vehicles.

* * * * *